(12) United States Patent
Gorokhov et al.

(10) Patent No.: US 8,583,132 B2
(45) Date of Patent: Nov. 12, 2013

(54) EFFICIENT CHANNEL STRUCTURE FOR A WIRELESS COMMUNICATION SYSTEM

(75) Inventors: Alexei Gorokhov, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1118 days.

(21) Appl. No.: 11/750,217

(22) Filed: May 17, 2007

(65) Prior Publication Data

US 2009/0052381 A1   Feb. 26, 2009

Related U.S. Application Data

(60) Provisional application No. 60/801,795, filed on May 18, 2006.

(51) Int. Cl.
*H04W 72/00* (2009.01)
*H04W 4/00* (2009.01)

(52) U.S. Cl.
USPC ......... 455/452.1; 455/454; 370/341; 370/343

(58) Field of Classification Search
USPC ......... 370/329, 340, 341, 343, 206, 208, 464, 370/465, 468; 375/260; 455/450, 451, 455/452.1, 454; 714/748, 749, 750, 790
See application file for complete search history.

(56) References Cited

U.S. PATENT DOCUMENTS

| | | | |
|---|---|---|---|
| 6,928,062 B2 * | 8/2005 | Krishnan et al. | 370/329 |
| 6,975,611 B1 * | 12/2005 | Balachandran et al. | 370/337 |
| 7,613,244 B2 * | 11/2009 | Hwang et al. | 375/260 |
| 8,310,994 B2 * | 11/2012 | Kwon et al. | 370/329 |
| 2003/0169722 A1 * | 9/2003 | Petrus et al. | 370/347 |
| 2004/0081123 A1 | 4/2004 | Krishnan et al. | |
| 2004/0160914 A1 | 8/2004 | Sarkar | |
| 2004/0229625 A1 * | 11/2004 | Laroia et al. | 455/450 |
| 2005/0250497 A1 * | 11/2005 | Ghosh et al. | 455/436 |

(Continued)

FOREIGN PATENT DOCUMENTS

| | | | |
|---|---|---|---|
| EP | 1580935 | 9/2005 | |
| EP | 1580935 A2 * | 9/2005 | H04L 12/28 |

(Continued)

OTHER PUBLICATIONS

International Search Report—PCT/US07/069308—International Search Authority, European Patent Office—Dec. 6, 2007.

(Continued)

*Primary Examiner* — George Eng
*Assistant Examiner* — Sowmini Nair
(74) *Attorney, Agent, or Firm* — Donald C. Kordich

(57) ABSTRACT

Systems and methodologies are described that provide efficient channel assignment and communication for a wireless communication network. System resources can be allocated for a traffic channel for communication between a base station and a terminal in a physical layer frame, a portion of which can be made available for an acknowledgement channel. Resources for the acknowledgement channel can then be allocated such that the resources allocated for the acknowledgement channel occupy only a portion of the resources available for the acknowledgement channel within the resources allocated for the traffic channel. By scheduling the acknowledgement channel such that it occupies only a portion of the resources available to it, traffic data and acknowledgements can be communicated in the wireless communication system on their respective channels more efficiently.

38 Claims, 21 Drawing Sheets

(56) References Cited

U.S. PATENT DOCUMENTS

| | | | |
|---|---|---|---|
| 2006/0193290 A1* | 8/2006 | Suzuki et al. | 370/329 |
| 2007/0242653 A1* | 10/2007 | Yang et al. | 370/342 |
| 2008/0052588 A1* | 2/2008 | Akash et al. | 714/748 |
| 2010/0135156 A1* | 6/2010 | Sarkar | 370/230 |
| 2011/0096740 A1* | 4/2011 | Kim et al. | 370/329 |

FOREIGN PATENT DOCUMENTS

| | | |
|---|---|---|
| KR | 20050084884 A | 8/2005 |
| RU | 2213420 C2 | 9/2003 |
| RU | 2232483 C2 | 7/2004 |
| WO | 2004054285 | 6/2004 |

OTHER PUBLICATIONS

Written Opinion—PCT/US07/069308—International Search Authority, European Patent Office—Dec. 6, 2007.

Taiwanese Search report—096118096—TIPO—Jun. 30, 2010.

Motorola, Uplink Control Signaling Considerations for E-UTRA,R1-061468,3GPP,May 12, 2006.

NTT DoCoMo, Fujitsu, Mitsubishi Electric, NEC, Sharp, Toshiba Corporation, L1/L2 Control Channel Structure for E-UTRA Uplink,R1-061183,3GPP, May 12, 2006.

Samsung, Uplink ACK/NACK Performance: FDM vs TDM, R1-061314, 3GPP, May 12, 2006.

* cited by examiner

EFFICIENT CHANNEL STRUCTURE FOR A WIRELESS COMMUNICATION SYSTEM

CROSS-REFERENCE

This application claims the benefit of U.S. Provisional Application Ser. No. 60/801,795, filed May 18, 2006, entitled "EFFICIENT CHANNEL STRUCTURE FOR WIRELESS COMMUNICATION SYSTEM," the entirety of which is incorporated herein by reference.

BACKGROUND

I. Field

The present disclosure relates generally to wireless communications, and more specifically to techniques for assigning resources in a wireless communication system.

II. Background

Wireless communication systems have recently become a prevalent means by which a majority of people worldwide have come to communicate. Such systems generally utilize different approaches to generate transmission resources in the form of channels. Examples of such systems include code division multiplexing (CDM) systems, frequency division multiplexing (FDM) systems, time division multiplexing (TDM) systems, and orthogonal frequency division multiplexing (OFDM) systems.

Further, wireless communication devices have recently become smaller and more powerful in order to meet consumer needs and to improve portability and convenience. The increase in processing power in mobile devices such as cellular telephones has lead to an increased demand for efficient wireless network transmission. However, wireless communication systems typically are not as easily updated as the cellular devices that communicate thereover. As mobile device capabilities expand, it has traditionally been difficult to maintain an older wireless network system in a manner that facilitates fully exploiting new and improved wireless device capabilities. Accordingly, there exists a need in the art for an efficient transmission scheme that can be implemented in a wireless communication system.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by providing an efficient channel structure for wireless network transmission. More particularly, one or more embodiments can allocate system resources for a traffic channel that can be used for communication between a base station and a terminal in a physical layer frame. The system resources may correspond to, for example, a data tile. Further, part of the system resources corresponding to the data tile may be available for an acknowledgement channel. System resources for the acknowledgement channel can then be allocated in the physical layer frame such that the acknowledgement channel occupies only a portion of the resources available for the acknowledgement channel within the resources allocated for the traffic channel. For example, a data tile allocated for a traffic channel may be composed of multiple subtiles, a portion of which may be available for an acknowledgement channel. The acknowledgement channel may then be allocated within the data tile such that it occupies only some of the available subtiles. By scheduling the acknowledgement channel such that it occupies only a portion of the resources available to it, traffic data and acknowledgements can be communicated on their respective channels more efficiently. Thus, system resources can be used more efficiently and systems capable of less system bandwidth can be made to more properly accommodate the demands of current cellular devices.

According to an aspect, a method for efficient channel assignment in a wireless communication system is described herein. The method may comprise allocating first system resources for a traffic channel for communication with a terminal on a reverse link frame, the first system resources comprise available resources for an acknowledgement (ACK) channel. In addition, the method may include allocating second system resources for the ACK channel for communication with the terminal on the reverse link frame, wherein the second system resources allocated for the ACK channel occupy only a portion of the available resources in the first system resources.

Another aspect relates to a wireless communications apparatus that may include a memory that stores data relating to available bandwidth for communication and an access terminal. The wireless communications apparatus may further comprise a processor configured to allocate a first portion of the available bandwidth for a traffic channel for communication with the access terminal on a reverse link frame, the first portion of the available bandwidth including available acknowledgement bandwidth, and to allocate a second portion of the available bandwidth for an acknowledgement channel for communication with the access terminal on the reverse link frame, wherein the second portion of the available bandwidth occupies less than all of the available acknowledgement bandwidth.

Yet another aspect relates to an apparatus that facilitates efficient channel assignment in a wireless communication system. The apparatus may comprise means for allocating resources for a traffic channel for communicating with a terminal corresponding to a data tile having resources composed of a plurality of tones for each of a plurality of modulation symbols. Further, the apparatus may include means for allocating resources for an acknowledgement channel for communication with the terminal such that the resources scheduled for the acknowledgement channel occupy a portion of the plurality of modulation symbols on the data tile.

Still another aspect relates to a computer-readable medium having stored thereon computer-executable instructions for channel structuring in a wireless communication system. The instructions may comprise allocating traffic bandwidth for communication with a wireless terminal, wherein the traffic bandwidth includes available acknowledgement bandwidth. In addition, the instructions may include allocating acknowledgement bandwidth for communication with the wireless terminal over less than all of the available acknowledgement bandwidth. Further, the instructions may include communicating an assignment for the acknowledgement bandwidth and the traffic bandwidth to the wireless terminal.

In accordance with another aspect, a processor is described herein that may execute computer-executable instructions for efficient channel assignment in a wireless communication environment. The instructions may include assigning a first portion of available system bandwidth to a traffic channel for communication with one or more terminals, the first portion of available system bandwidth corresponding to a plurality of modulation symbols modulated over a plurality of frequency subcarriers. Further, the instructions may comprise assigning a second portion of the available system bandwidth to an acknowledgement channel for communication with the one or more terminals, wherein the second portion of the available bandwidth punctures less than all of the modulation symbols corresponding to the first portion of the available system bandwidth.

In accordance with yet another aspect, a method for efficient communication in a wireless communication system is described herein. The method may comprise receiving scheduled system resources for a traffic channel and an acknowledgement channel, wherein the system resources for the acknowledgement bandwidth puncture a portion of the system resources for the traffic channel that are made available for the acknowledgement channel. Additionally, the method may include transmitting traffic data to a base station using the traffic bandwidth. Further, the method may include communicating one or more of traffic data, an implicit acknowledgement, and an explicit acknowledgement to a base station using the scheduled system resources.

Another aspect relates to a wireless communications apparatus that may include a memory that stores data relating to an assignment of modulation symbols for a traffic channel and an assignment of modulation symbols for an acknowledgement channel, wherein the acknowledgement channel occupies a portion of the modulation symbols for the traffic channel. Further, the wireless communications apparatus may include a processor configured to communicate one or more of traffic data on the modulation symbols corresponding to the traffic channel and an acknowledgement on the modulation symbols corresponding to the acknowledgement channel.

Yet another aspect relates to an apparatus that facilitates efficient communication in a wireless communication system. The apparatus may comprise means for receiving scheduled bandwidth for communication corresponding to a traffic channel that includes available acknowledgement bandwidth and an acknowledgement channel that occupies less than all of the available acknowledgement bandwidth. The apparatus may further include means for communicating one or more of traffic data and an acknowledgement to an access point using the scheduled bandwidth.

Still another aspect relates to a computer-readable medium having stored thereon computer-executable instructions for efficient communication in a wireless network system. The instructions may include receiving a communication schedule that includes allocated bandwidth for a traffic channel and allocated bandwidth for an acknowledgement channel over a plurality of modulation symbols such that the allocated bandwidth for the acknowledgement channel occupies the allocated bandwidth for the traffic channel over a portion of the plurality of modulation symbols. Further, the instructions may comprise one or more of traffic data and acknowledgement data using the allocated bandwidth.

In accordance with another aspect, a processor is described herein that may execute computer-executable instructions for communicating in a wireless network environment. The instructions may comprise obtaining scheduled traffic bandwidth including available acknowledgement bandwidth and scheduled acknowledgement bandwidth, wherein the scheduled acknowledgement bandwidth occupies only a portion of the available acknowledgement bandwidth. Additionally, the instructions may comprise communicating traffic data to a base station using the scheduled traffic bandwidth. Further, the instructions may include communicating at least one of an acknowledgement, an explicit negative acknowledgement, and an implicit negative acknowledgement to the base station using the scheduled acknowledgement bandwidth.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
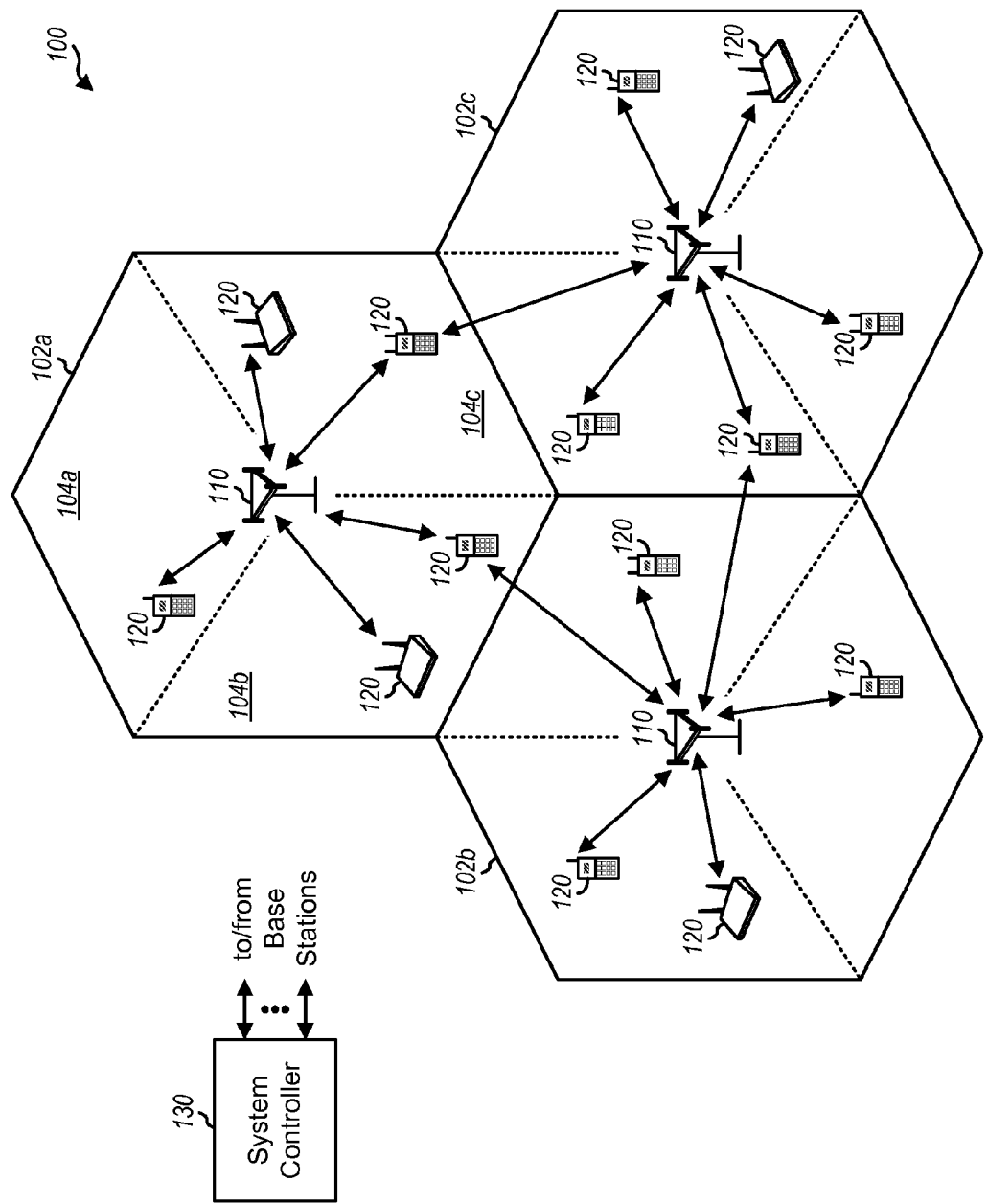
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Each base station 110 and terminal 120 in system 100 may have one or more antennas to facilitate communication with one or more base stations 110 and/or terminals 120 in system 100. In one example, a base station 110 can simultaneously transmit multiple data streams for broadcast, multicast, and/or unicast services, wherein a data stream is a stream of data that can be of independent reception interest to a terminal 120. A terminal 120 within the coverage area of a base station 110 can then receive one or more of the data streams transmitted from the base station 110. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used. To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In a cell 102 having multiple sectors 104, the BTSs for all sectors 104 of the cell 102 can be co-located within the base station 110 for the cell 102.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed.

In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal may be a wireless device, a cellular phone, a personal digital assistant (PDA), a wireless modem, a handheld device, and so on. In one example, a terminal 120 can transmit data to a base station 110 or to another terminal 120.

In accordance with another aspect, system 100 can generate transmission resources in the form of channels. By way of non-limiting example, these channels can be generated via one or more of code division multiplexing (CDM), frequency division multiplexing (FDM), and time division multiplexing (TDM). Orthogonal frequency division multiplexing (OFDM), a variant of FDM, may be used to effectively partition the overall bandwidth of system 100 into multiple orthogonal subcarriers, which can then be modulated with data. These subcarriers may also be referred to as tones, bins, and frequency channels. Alternatively, in a time division based technique, each subcarrier can comprise a portion of sequential time slices or time slots. Each terminal 120 may be provided with one or more time slot/subcarrier combinations for transmitting and receiving information in a defined burst period or frame. A time division technique may also utilize a symbol rate hopping scheme and/or a block hopping scheme.

In another example, a code division based technique can facilitate the transmission of data over a number of frequencies available at any time in a range. Data can be digitized and spread over available bandwidth of system 100 such that multiple terminals 120 can be overlaid on the channel and respective terminals 120 can be assigned a unique sequence code. Terminals 120 can then transmit in the same wide-band chunk of spectrum, wherein a signal corresponding to each terminal 120 is spread over the entire bandwidth by its respective unique spreading code. In one example, this technique can provide for sharing, wherein one or more terminals 120 can concurrently transmit and receive. Such sharing can be achieved, for example, through spread spectrum digital modulation, wherein a stream of bits corresponding to a terminal 120 is encoded and spread across a very wide channel in a pseudo-random fashion. A base station 110 can then recognize the unique sequence code associated with a terminal 120 and undo the randomization in order to collect the bits for the particular terminal 120 in a coherent manner.

In another example, system 100 may utilize one or more multiple-access schemes, such as CDMA, TDMA, FDMA, OFDMA, Single-Carrier FDMA (SC-FDMA), and/or other suitable multiple-access schemes. OFDMA utilizes Orthogonal Frequency Division Multiplexing (OFDM), and SC-FDMA utilizes Single-Carrier Frequency Division Multiplexing (SC-FDM). Additionally, system 100 may utilize a combination of multiple-access schemes, such as OFDMA and CDMA. Additionally, system 100 may utilize various framing structures to indicate the manner in which data and signaling are sent on forward and reverse links. System 100 may further utilize one or more schedulers (not shown) to assign bandwidth and other system resources. In one example, a scheduler may be employed at one or more of a base station 110, a terminal 120, and a system controller 130.

Figure 2A:
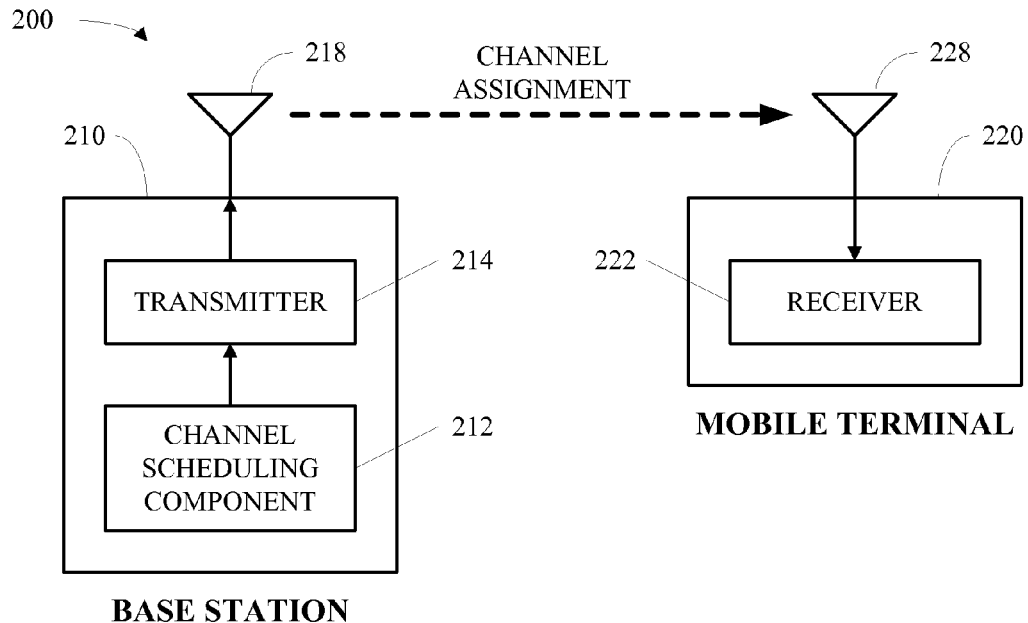
FIG. 2A is a block diagram of a system that facilitates efficient communication in a wireless communication environment in accordance with various aspects.

FIG. 2A is a block diagram of a system 200 that facilitates efficient communication in a wireless communication environment. In one example, system 200 includes one or more base stations 210 and one or more mobile terminals 220. While only one base station 210 and one mobile terminal 220 are illustrated in FIG. 2A for simplicity, it should be appreciated that system 200 may include any number of base stations 210 and mobile terminals 220. In accordance with one aspect, base station 210 and mobile terminal 220 can communicate via antenna 212 at base station 210 and antenna 222 at mobile terminal 220. Alternatively, base station 210 and/or mobile terminal 220 may have a plurality of antennas 212 and/or 222 for communicating with multiple base stations 210 and/or mobile terminals 220 in system 200.

In accordance with one embodiment, base station 210 and mobile terminal 220 can communicate on a forward link ("downlink") as illustrated in FIG. 2A. In one example, base station 210 includes a channel scheduling component 212 that allocates system resources for one or more channels to be used for communication with mobile terminal 220 on one or more physical layer frames (PHY frames, or simply "frames"). It should be appreciated that although channel scheduling component 212 is illustrated as a component of base station 210, channel scheduling component 212 can alternatively be a component of mobile terminal 220, a component of a centralized system controller (not shown) in communication with base station 210 and mobile terminal 220, or a stand-alone component communicatively connected to base station 210 and mobile terminal 220.

In one example, channel scheduling component 212 can allocate system resources for a traffic channel for communication with mobile terminal 220 on a frame in a reverse link ("uplink"), through which mobile terminal 220 may communicate data, control signaling (e.g., pilots, channel quality information, requests, and/or other suitable channel information), or any other suitable information or combination thereof. Additionally, a portion of the resources in the traffic channel may be available to channel scheduling component 212 for an acknowledgement (ACK) channel for communication with mobile terminal 220 on a frame in the reverse link. On the ACK channel, mobile terminal 220 can communicate an acknowledgement to base station 210 corresponding to data and/or signaling correctly received from base station 210. Additionally and/or alternatively, mobile terminal 220 can communicate a negative acknowledgement (NACK) corresponding to incorrectly received data. A NACK communicated by mobile terminal 220 may be explicitly communicated on the ACK channel, or alternatively a NACK may be communicated implicitly by abstaining from communicating a positive ACK for particular data and/or signaling when an ACK is expected. In accordance with one aspect, resources for the ACK channel can be scheduled by channel scheduling component 212 at a common reverse link frame with a traffic channel such that only a portion of the available resources in the traffic channel are used for the ACK channel. Thus, channel scheduling component 212 can facilitate efficient communication of acknowledgements and traffic data in a single transmission structure.

Once channel scheduling component 212 allocates resources for one or more channels for communication with mobile terminal 220, channel scheduling component 212 can create a channel assignment that assigns mobile terminal 220 to an allocated traffic channel on a specified reverse link frame. Further, channel scheduling component 212 can assign mobile terminal 220 to an allocated ACK channel either explicitly or implicitly based on other resources assigned to mobile terminal 220. The channel assignment can then be sent to mobile terminal 220 on the forward link by transmitter 214 at base station 210 via antenna 218. Once sent, the channel assignment can be received at receiver 222 of mobile terminal 220 via antenna 228.

Figure 2B:
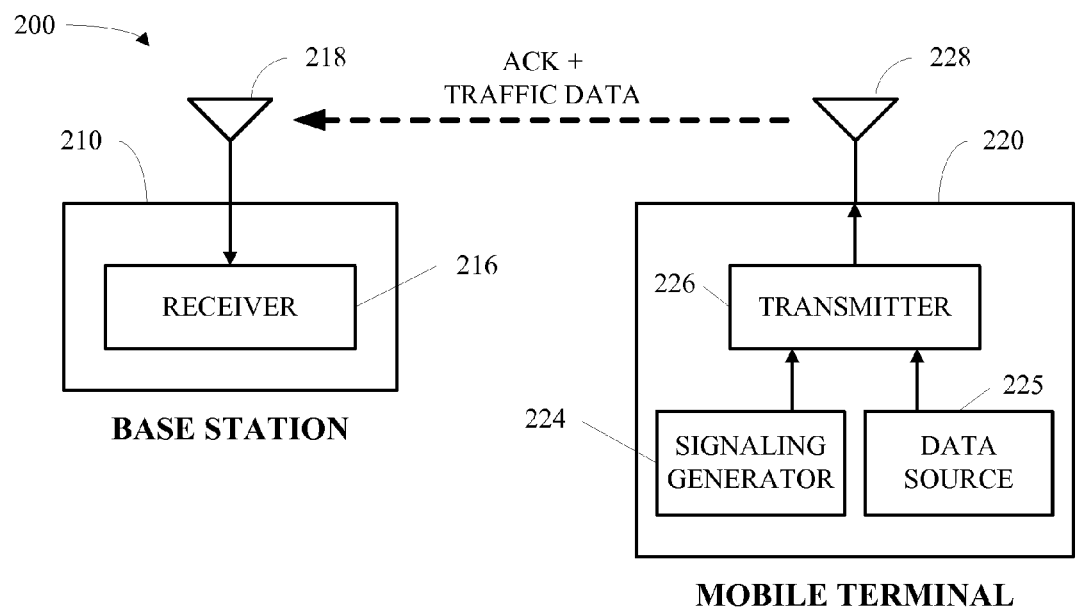
FIG. 2B is a block diagram of a system that facilitates efficient communication in a wireless communication environment in accordance with various aspects.

FIG. 2B is a block diagram illustrating an example reverse link transmission in system 200. In accordance with one aspect, mobile terminal 220 includes a signaling generator 224, which can generate signaling such as an acknowledgement(s) and/or negative acknowledgement(s) for data and/or signaling received from base station 210 on the forward link and/or other signaling. Additionally, mobile terminal 220 includes a data source 225 that can contain data to be communicated to base station 210. In one example, signaling generated by signaling generator 224 and data contained at data source 225 can be provided to transmitter 226 for communication to base station 210 via antenna 228. The information communicated by mobile terminal 220 can then be received at receiver 216 of base station 210 via antenna 218.

In accordance with one aspect, transmitter 226 at mobile terminal 220 can transmit data and/or signaling to base station 210 on one or more channels assigned to mobile terminal 220 by base station 210. This assignment can be made, for example, during a forward link transmission similar to the transmission illustrated by FIG. 2A. As another example further illustrated by FIG. 2A, a channel assignment received from base station 210 can include an assignment for a traffic channel as well as an implicit or explicit assignment for an ACK channel. In accordance with one aspect, the traffic channel and the ACK channel can be allocated such that the ACK channel occupies only a portion of the bandwidth in the traffic channel available for the ACK channel. Thus, transmitter 226 can efficiently communicate both an ACK/NACK and traffic data in a common reverse link transmission.

Figure 3A:
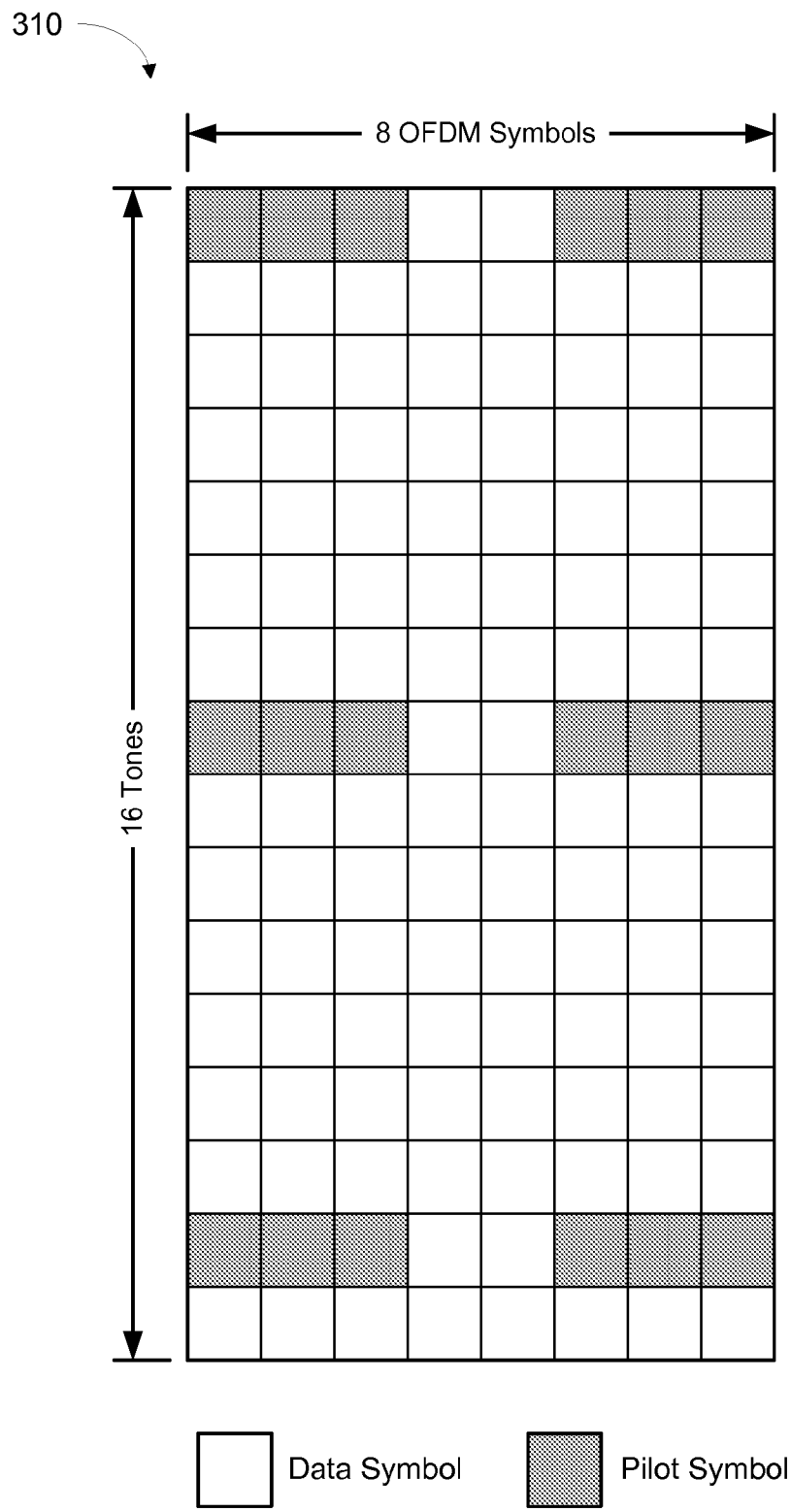
FIGS. 3A-3B illustrate example data tile structures that can be employed in a wireless communication system in accordance with various aspects.

FIG. 3A illustrates an example data tile structure 310 that can be employed in a wireless communication system (e.g., system 100). In accordance with one aspect, data tile 310 can correspond to a portion of bandwidth in the wireless communication system. Further, the bandwidth represented by data tile 310 may correspond to, for example, one or more traffic channels. In accordance with another aspect, data tile 310 can be composed of M frequency subcarriers (or "tones"), over which N modulation symbols in time, such as OFDM symbols, may be modulated. Thus, data tile 310 can represent system bandwidth corresponding to M×N modulation symbols. In the non-limiting example illustrated by FIG. 3A, data tile 310 contains 16×8 symbols, corresponding to 8 OFDM symbols modulated over 16 tones. Each of the symbols in data tile 310 can correspond to either traffic data, represented as lighter units in data tile 310, or pilots, represented as darker units in data tile 310. By way of non-limiting example, pilots can be used, for example, in channel estimation, acquisition, and/or other suitable uses. In the example illustrated by data tile 310, pilot symbols can be provided at predetermined OFDM symbols at one or more tones. The pilot symbols can be provided on the same tones for each OFDM symbol as illustrated by data tile 310, or alternatively the pilot symbols can be provided on different tones for each OFDM symbol.

Figure 3B:
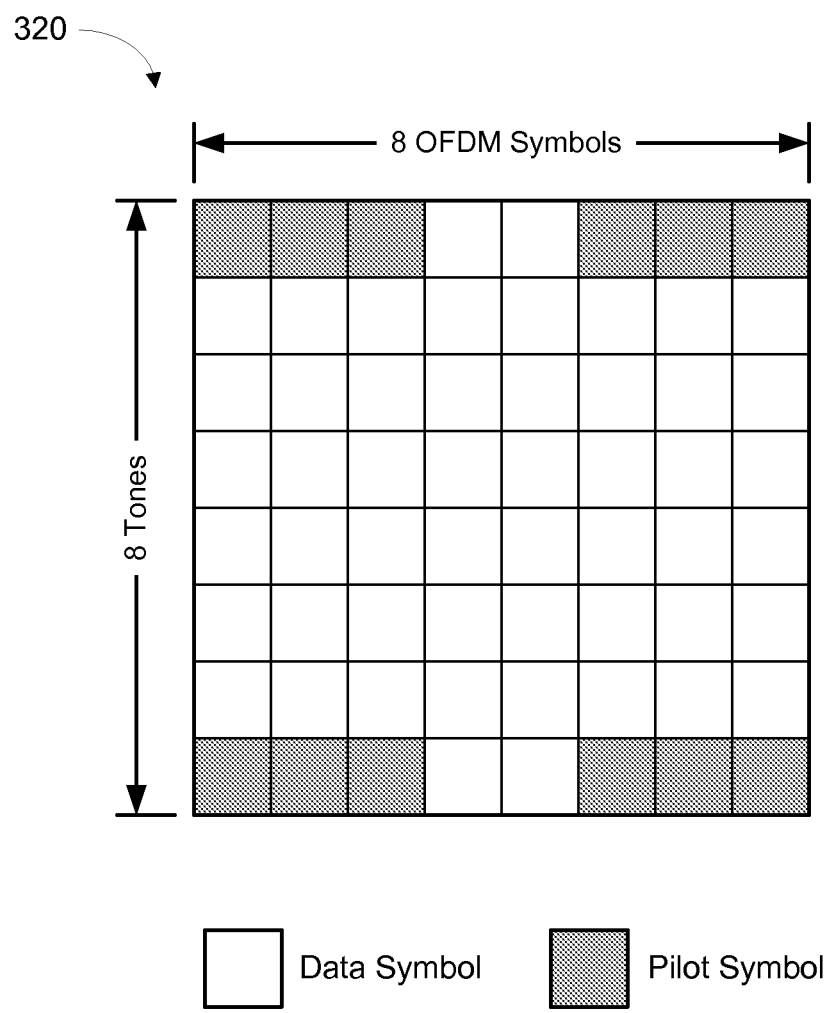

FIG. 3B illustrates an alternative example data tile structure 320 that can be employed in a wireless communication system. Similar to data tile 310, data tile 320 can represent system bandwidth composed of OFDM symbols in time modulated over frequency subcarriers. However, unlike the example illustrated with respect to data tile 310, each OFDM symbol in example data tile 320 is modulated over only 8 tones. The smaller amount of tones provided in data tile structure 320 may be utilized, for example, in a wireless communication system with a limited range of frequency operation where fewer frequency subcarriers are available. By way of specific, non-limiting example, data tile 310 may be utilized in a system with a 5 MHz deployment bandwidth while data tile 320 may be utilized in a system with a deployment bandwidth of 1.25 MHz or 2.5 MHz. Data tile 320 may be utilized in a low-bandwidth deployment, for example, to allow the allocation of more traffic channels in a smaller bandwidth and/or to counteract the loss of diversity associated with a smaller bandwidth deployment. Similar to data tile 310, symbols in data tile 320 may correspond to traffic data or pilots. Further, in alternative examples, pilot symbols may be provided at predetermined OFDM symbols at uniform or non-uniform tones.

Figure 4:
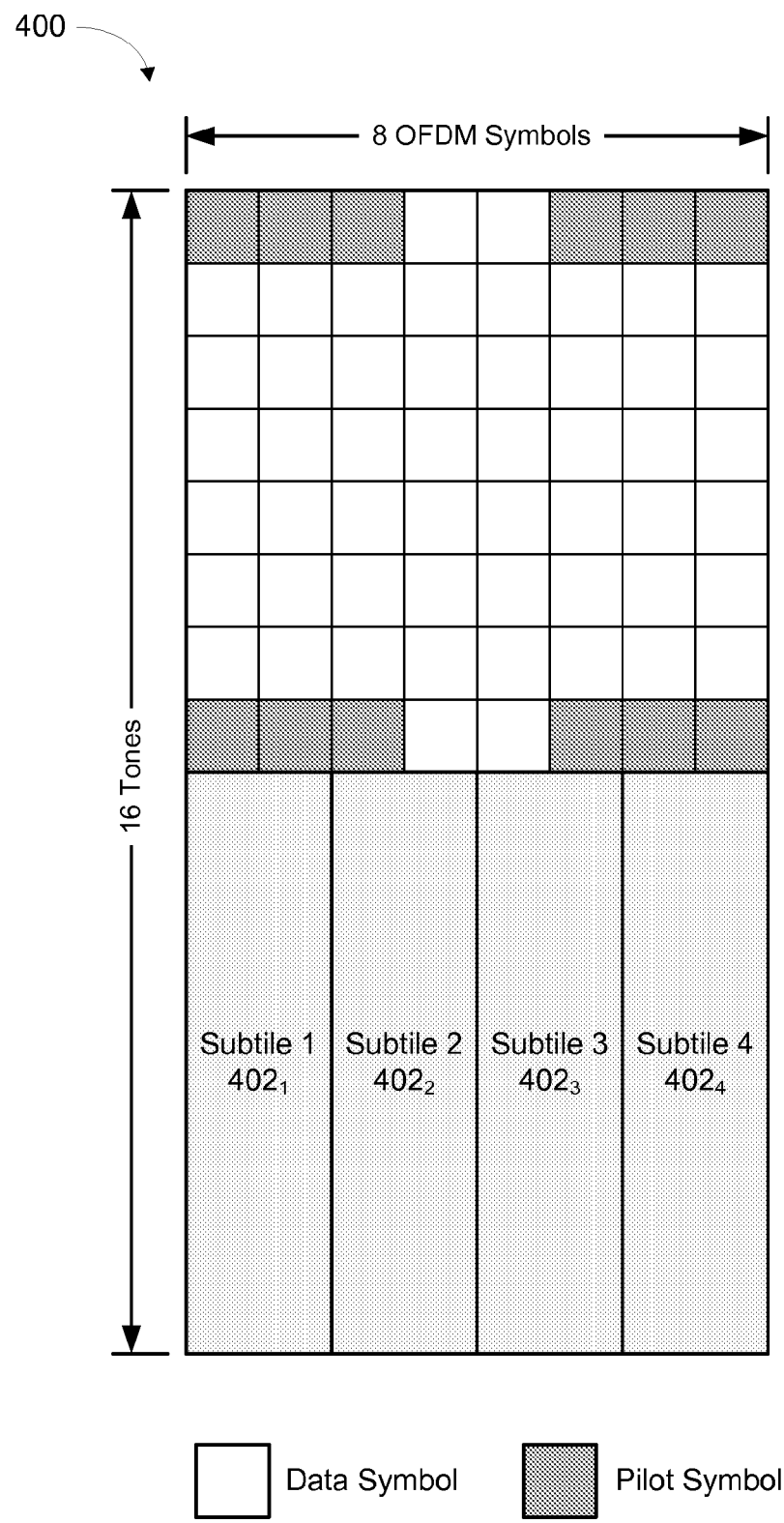
FIG. 4 illustrates an example data tile structure that can be employed in a wireless communication system in accordance with various aspects.

FIG. 4 illustrates another example data tile structure 400 that can be employed in a wireless communication system. In one example, data tile 400 represents bandwidth that is composed of 8 OFDM symbols modulated over 16 tones in a similar manner to data tile 310. However, in the example represented by data tile 400, the symbols modulated over the first 8 tones of data tile 400 are dedicated to traffic data and/or pilots while the symbols over the lower 8 tones of data tile 400 are grouped into subtiles 402 that are made available to an acknowledgement channel (ACKCH).

In one example, each subtile 402 in data tile 400 covers an area of 2 OFDM symbols modulated over 8 tones. In a further example, sets of subtiles 402 made available to an ACKCH may occupy an 8×8 symbol area at the bottom half of a predetermined number of data tiles 400. Thus, ACKCH subtiles 402 may occupy the lower 8 frequency subcarriers of a predetermined number of data tiles 400. The 8×8 symbol area made available to ACK subtiles 402 in a data tile 400 may also be referred to as a half-tile or an ACKCH tile. In one example, the number of ACKCH tiles in a wireless communication system can scale as required by the number of traffic channels in the wireless communication system. Additionally, a minimum of 4 ACKCH tiles may be required in order to ensure channel and interference diversity in the system. In another example, each subtile 402 can accommodate 8 ACKCH bits, which can correspond to 8 different traffic channels. Each ACKCH bit may be transmitted over subtiles 402 taken from different data tiles 400, thereby ensuring fourth-order diversity. In a further example, subtiles 402 can hop randomly among data tiles 400 in a wireless communication to ensure that the ACKCH uniformly punctures all traffic channels in the system.

Figure 5:
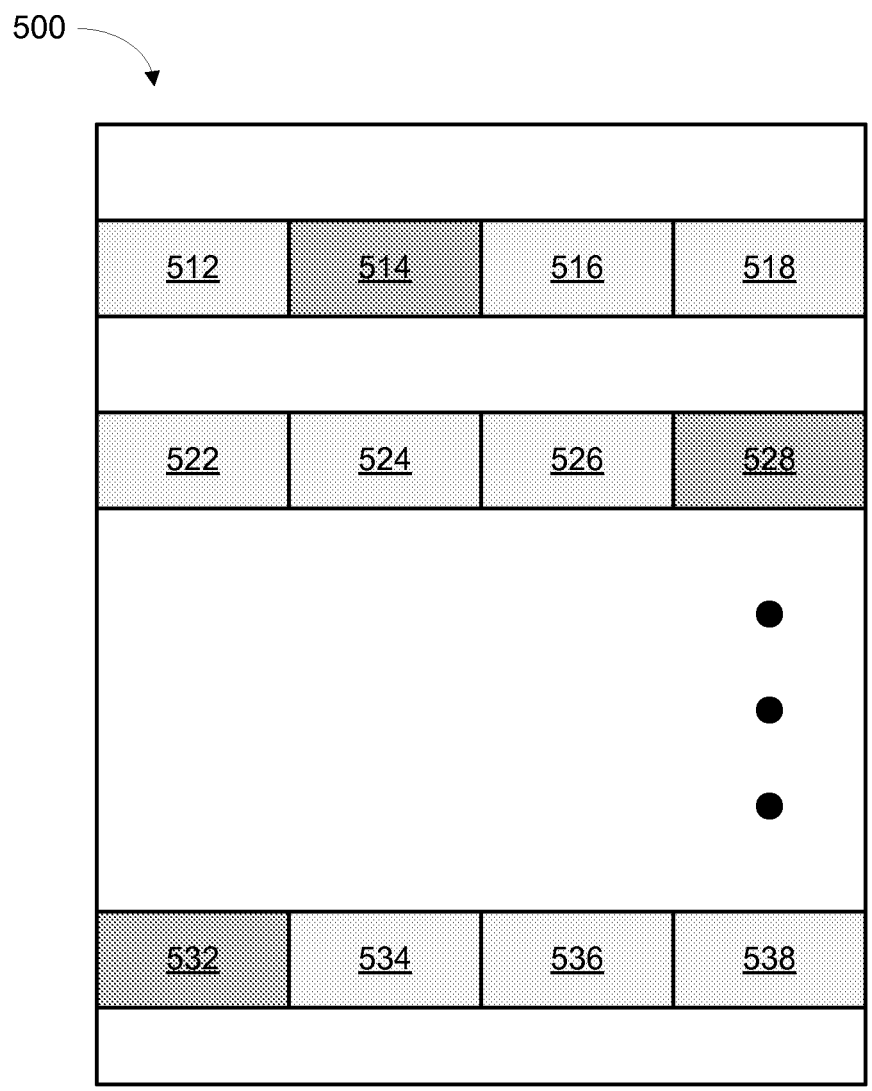
FIG. 5 illustrates example acknowledgement channel performance in accordance with various aspects.

FIG. 5 illustrates example acknowledgement channel performance 600 in a wireless communication system. In one example, blocks 512-538 in FIG. 5 represent subtiles (e.g., subtiles 402) having ACKCH bits stored therein. Further, each of the rows 512-518, 522-528, and 532-538 correspond to subtiles in data tiles (e.g., data tiles 400). In another example, an ACKCH bit can be transmitted over subtiles taken over different data tiles, as represented by darkened blocks 514, 528, and 532. By transmitting an ACKCH bit over different subtiles and data tiles, fourth-order diversity can be achieved for the acknowledgement channel.

Figure 6A:
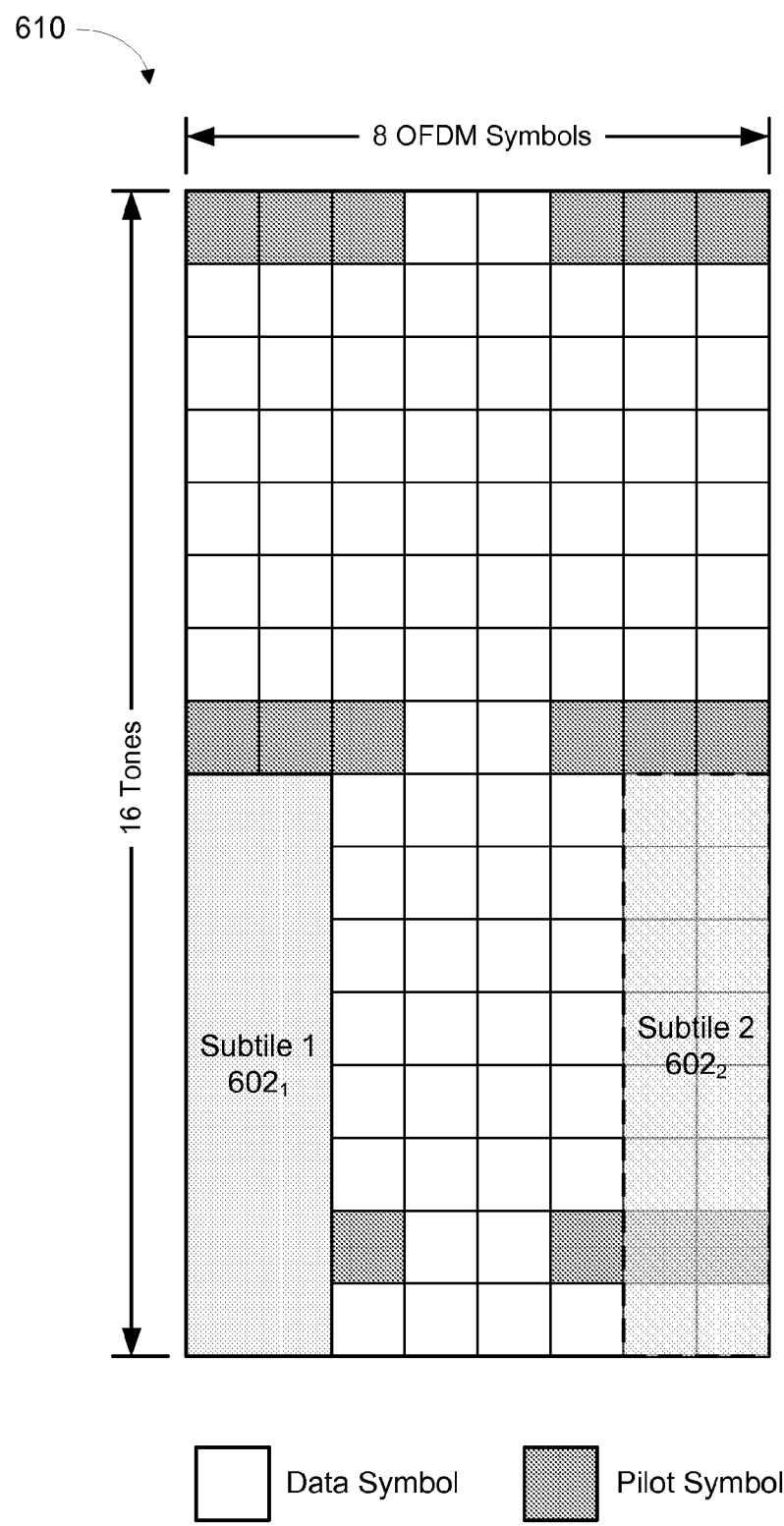
FIGS. 6A-6B illustrate example data tile structures that facilitate efficient wireless network transmission in accordance with various aspects.

Referring now to FIG. 6A, an example data tile structure 610 that facilitates efficient wireless network transmission in accordance with various aspects is illustrated. In one example, data tile 610 is composed of 8 OFDM symbols in time modulated over 16 tones in a similar manner to data tile 310. Further, each of the symbols in data tile 610 can correspond to either traffic data, represented as lighter units in data tile 610, or pilots, represented as darker units in data tile 610. In another example, data tile 610 may represent all or part of bandwidth allocated to a traffic channel.

In accordance with one aspect, the symbols modulated over the lower 8 tones of data tile 610 may be made available to an ACK channel in a similar manner to data tile 400. In a wireless system with a small bandwidth deployment, however, there may not be enough traffic channels to necessitate allocation of the ACK channel across all of the available symbols in data tile 610. Thus, resources for the ACK channel may be allocated over a first subtile $602_1$ and/or a second subtile $602_2$, such that only a portion of the available resources in data tile 610 are utilized for the ACK channel. By way of specific, non-limiting example, one subtile 602 may be utilized in a 1.25 MHz deployment and two subtiles 602 may be used for a 2.5 MHz deployment. In one example, each subtile 602 covers an area of 2 OFDM symbols modulated over 8 tones in a similar manner to subtiles 402. Further, subtiles 602 may be provided on multiple data tiles 610 such that multiple looks for each ACKCH bit may be taken across multiple data tiles in order to facilitate fourth-order diversity for the acknowledgement channel. Subtiles 602 may also hop randomly among data tiles 610 to ensure that the acknowledgement channel uniformly punctures all traffic channels in the system.

In accordance with one aspect, however, subtiles 602 are only allocated on a portion of the bandwidth provided by the OFDM symbols in data tile 610. As illustrated by data tile 610, the OFDM symbols on which a subtile 602 is not scheduled may continue to carry traffic data and/or pilots on one or more traffic channels. Thus, a larger portion of the bandwidth in each data tile 610 in the wireless communication system may be used for traffic data, thereby facilitating efficient transmission in the system. Further, because each set of pilot symbols in example data tile 610 spans three OFDM symbols, only a portion of each set of pilot symbols may be punctured. Thus, in one example, operations in the wireless communication system utilizing pilots, such as channel estimation and/or acquisition, may be conducted substantially as though no puncture of the pilot symbols has occurred.

Figure 6B:
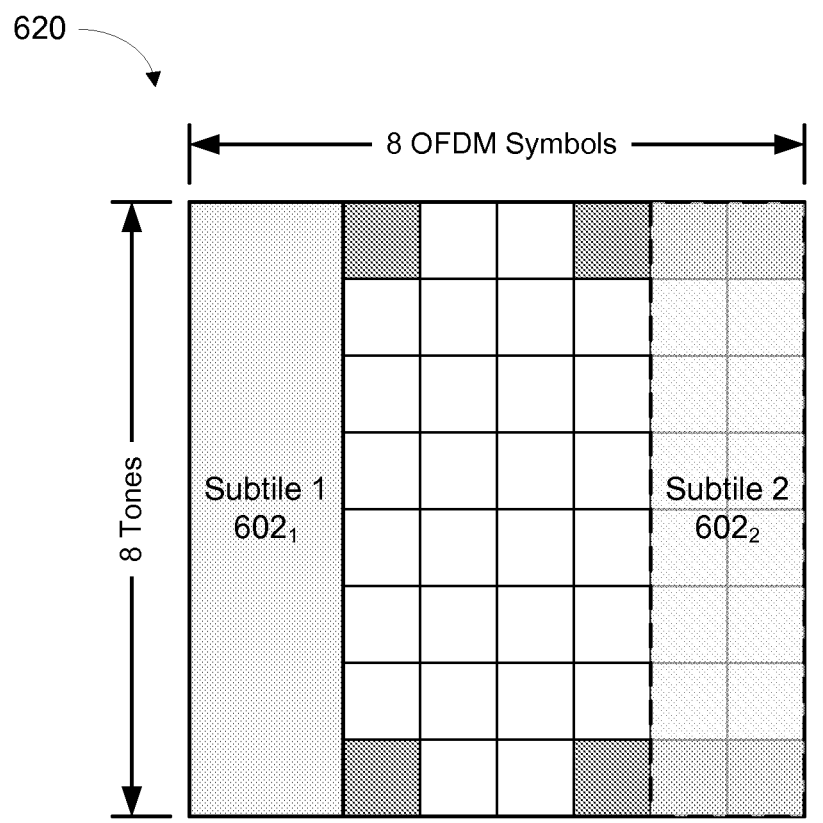

FIG. 6B illustrates an alternate example data tile structure 620 that facilitates efficient wireless network transmission in accordance with various aspects. In one example, the bandwidth represented by data tile 620 may be composed of 8 OFDM symbols modulated over 8 tones. Similar to data tile structure 320, data tile structure 620 may be utilized, for example, in a wireless communication system with a limited range of frequency operation where fewer tones are available. In accordance with one aspect, one or more subtiles 602 corresponding to an acknowledgement channel may be allocated such that they puncture a portion of the bandwidth represented by data tile 620.

Because example data tile 620 only represents bandwidth corresponding to 8 tones, making an 8×8 tile available to an ACK channel, as illustrated in FIG. 4, is impracticable because such a tile would necessarily puncture all of the traffic bandwidth provided in data tile 620. By scheduling ACKCH subtiles 602 over only a portion of the OFDM symbols in data tile 620, data tile 620 can carry traffic data as well as data relating to an acknowledgement channel despite its smaller size compared to data tile 610. In a further example, each set of pilot symbols in data tile 620 can span three OFDM symbols in a similar manner to data tile 610. Thus, only a portion of each set of pilot symbols are punctured by ACKCH subtiles 602 and operations in the wireless communication system utilizing pilots, such as channel estimation and acquisition, may be conducted substantially as though no puncture of the pilot symbols has occurred.

Figure 7A:
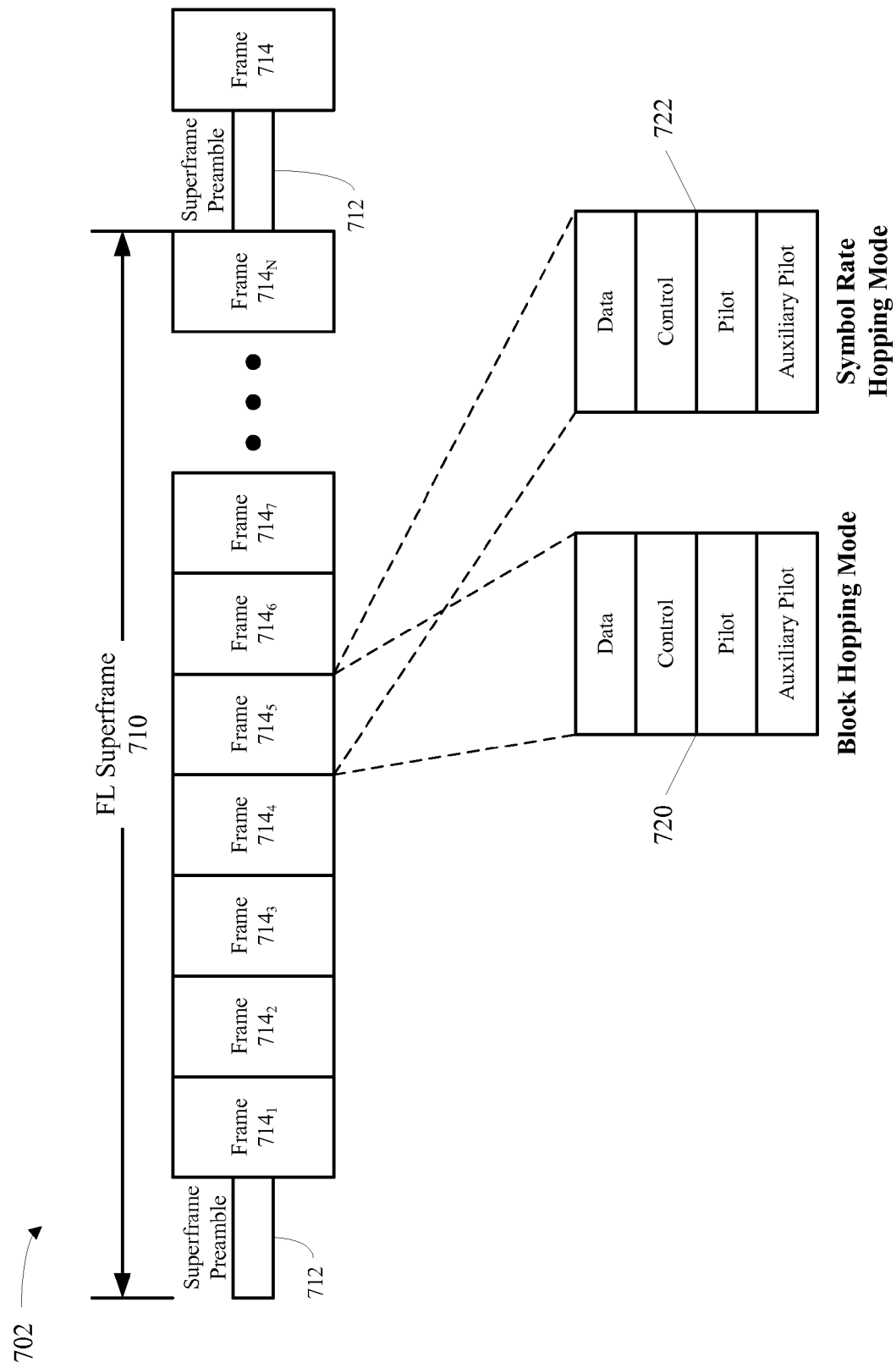
FIGS. 7A-7B illustrate example superframe structures for a multiple access wireless communication system.

FIG. 7A illustrates an example superframe structure 702 for a multiple access wireless communication system (e.g., system 100) utilizing frequency division duplexing (FDD). In one example, a superframe preamble 712 is transmitted at the beginning of each superframe 710. Alternatively, superframe preamble 712 may be interspersed within superframe 710 as a preamble and a midamble. While superframe 710 is illustrated as a forward link (FL) superframe, it should be appreciated that superframe 710 could alternatively be a reverse link superframe.

In one example, each superframe 710 can consist of a superframe preamble 712 followed by a series of frames 714. Frames 714 in one or more superframes 710 may additionally be divided into one or more frame interlaces. In accordance with one aspect, each superframe 710 may also span all or part of the deployed bandwidth of the system, which may be divided into one or more frequency carriers and/or subbands. In a specific, non-limiting example, the system bandwidth may correspond to a 5 MHz frequency band and may be divided into subbands that are 128 tones each in size. As an alternative non-limiting example, for a smaller deployed bandwidth such as 2.5 MHz or 1.25 MHz, each subband may only be 64 tones in size. Smaller subbands may be utilized in connection with a smaller system bandwidth, for example, to reduce control overhead in the system and to allow sufficient ACK channel tiles to be scheduled on each interlace. In FDD structure 702, a reverse link transmission and a forward link transmission may occupy different frequencies such that transmissions on the forward and reverse links are substantially non-overlapping on any given frequency subcarrier. In another example, superframe preamble 712 can contain a pilot channel that can include pilots that may be used for channel estimation by access terminals. Further, superframe preamble 712 can include a broadcast channel that includes configuration information that an access terminal (e.g., a terminal 120) may utilize to demodulate information contained in a forward link frame 714. Additionally and/or alternatively, superframe preamble 712 may include acquisition information such as timing and other information sufficient for an access terminal to communicate, power control information, and/or offset information. Thus, superframe preamble 712 may contain one or more of a common pilot channel; a broadcast channel, including system and configuration information; an acquisition pilot channel, used to acquire timing and other information; and a sector interference channel, including indicators from a sector of its measured interference with respect to other sectors. In one example, these channels can be provided via a CDMA control segment on one or more interlaces.

In another example, information from one or more channels may be included in a single jointly encoded packet to reduce overhead in superframe preamble 712. For example, information from adjacent symbols for different superframe preamble channels may be jointly encoded. In a further example, messages for channels in a superframe preamble 712 may span multiple superframe preambles 712 of different superframes 710. This may be utilized, for example, to improve decoding capability by allocating greater resources to high-priority messages.

In accordance with one aspect, superframe preamble 712 can be followed by a sequence of frames 714. Each frame 714 can consist of a uniform or non-uniform number of OFDM symbols and a uniform or non-uniform number of subcarriers that may simultaneously be utilized for transmission. In one example, each frame 714 may operate according to a symbol rate hopping mode 722, wherein one or more non-contiguous OFDM symbols are assigned to a terminal on a forward link or reverse link. Alternatively, each frame 714 may operate according to a block hopping mode 720, wherein terminals may hop within a block of OFDM symbols. In both block hopping mode 720 and symbol rate hopping mode 722, blocks or OFDM symbols may or may not hop between frames 714.

In accordance with another aspect, superframe 710 may not utilize a superframe preamble 712. In one alternative, a preamble may be provided for one or more frames 714 that includes equivalent information to superframe preamble 712. In another alternative, a broadcast control channel may be utilized to contain some or all of the information of superframe preamble 712. Other information may additionally be contained in a preamble or control channel of a frame 714.

Figure 7B:
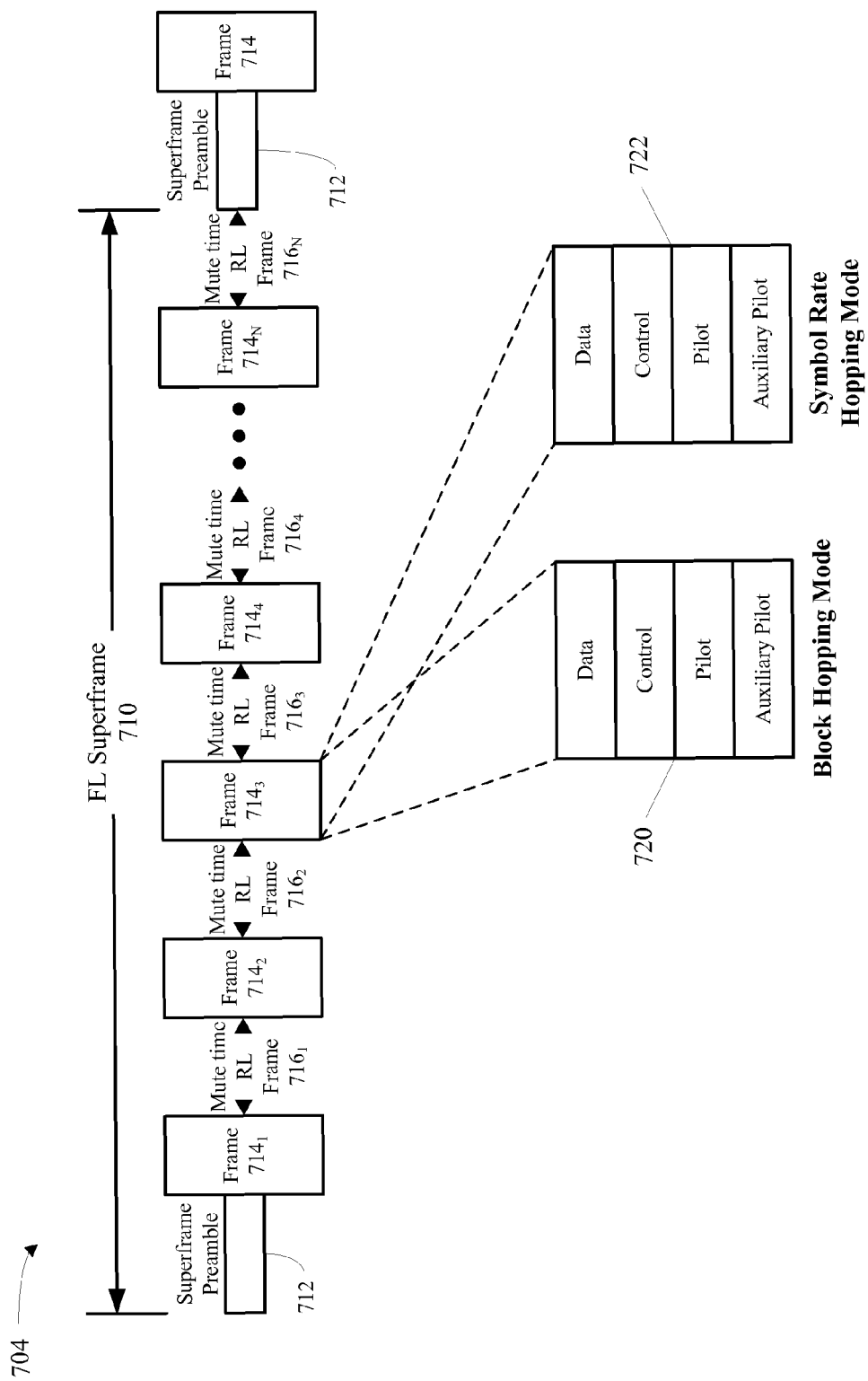

FIG. 7B illustrates an example superframe structure 704 for a multiple access wireless communication system (e.g., system 100) utilizing time division duplexing (TDD). In one example, a superframe preamble 712 is transmitted at the beginning of each superframe 710. Alternatively, superframe preamble 712 may be interspersed within superframe 710 as a preamble and a midamble. While superframe 710 is illustrated as a forward link (FL) superframe, it should be appreciated that superframe 710 could alternatively be a reverse link superframe.

In one example, each superframe 710 can consist of a superframe preamble 712 followed by a series of frames 714. In TDD structure 704, forward link frames 714 and reverse link frames 716 may be divided in time such that a predetermined number of forward link frames 714 are continuously transmitted prior to allowing transmission of a predetermined number of reverse link frames 716. As illustrated in superframe structure 704, a forward link superframe 710 will experience mute time during the transmission of one or more reverse link frames 716. Similarly, it should be appreciated that a reverse link superframe would experience mute time during the transmission of forward link frames 714. Further, it should be appreciated that any number of forward link frames 714 and any number of reverse link frames 716 may be continuously transmitted in superframe structure 704 and that said numbers of frames may vary within a given superframe or between superframes.

In another example, superframe preamble 712 can contain a pilot channel that can include pilots that may be used for channel estimation by access terminals. Further, superframe preamble 712 can include a broadcast channel that includes configuration information that an access terminal (e.g., a terminal 120) may utilize to demodulate information contained in a forward link frame 714. Additionally and/or alternatively, superframe preamble 712 may include acquisition information such as timing and other information sufficient for an access terminal to communicate, power control information, and/or offset information. Thus, superframe preamble 712 may contain one or more of a common pilot channel; a broadcast channel, including system and configuration information; an acquisition pilot channel, used to acquire timing and other information; and a sector interference channel, including indicators from a sector of its measured interference with respect to other sectors.

In another example, information from one or more channels may be included in a single jointly encoded packet to reduce overhead in superframe preamble 712. For example, information from adjacent symbols for different superframe preamble channels may be jointly encoded. In a further example, messages for channels in a superframe preamble 712 may span multiple superframe preambles 712 of different superframes 710. This may be utilized, for example, to improve decoding capability by allocating greater resources to high-priority messages.

In accordance with one aspect, superframe preamble 712 can be followed by a sequence of frames 714. Each frame 714 can consist of a uniform or non-uniform number of OFDM symbols and a uniform or non-uniform number of subcarriers that may simultaneously be utilized for transmission. In one example, each frame 714 may operate according to a symbol rate hopping mode 722, wherein one or more non-contiguous OFDM symbols are assigned to a terminal on a forward link or reverse link. Alternatively, each frame 714 may operate according to a block hopping mode 720, wherein terminals may hop within a block of OFDM symbols. In both block hopping mode 720 and symbol rate hopping mode 722, blocks or OFDM symbols may or may not hop between frames 714.

In accordance with another aspect, superframe 710 may not utilize a superframe preamble 712. In one alternative, a preamble may be provided for one or more frames 714 that includes equivalent information to superframe preamble 712. In another alternative, a broadcast control channel may be utilized to contain some or all of the information of superframe preamble 712. Other information may additionally be contained in a preamble or control channel of a frame 714.

Figure 8:
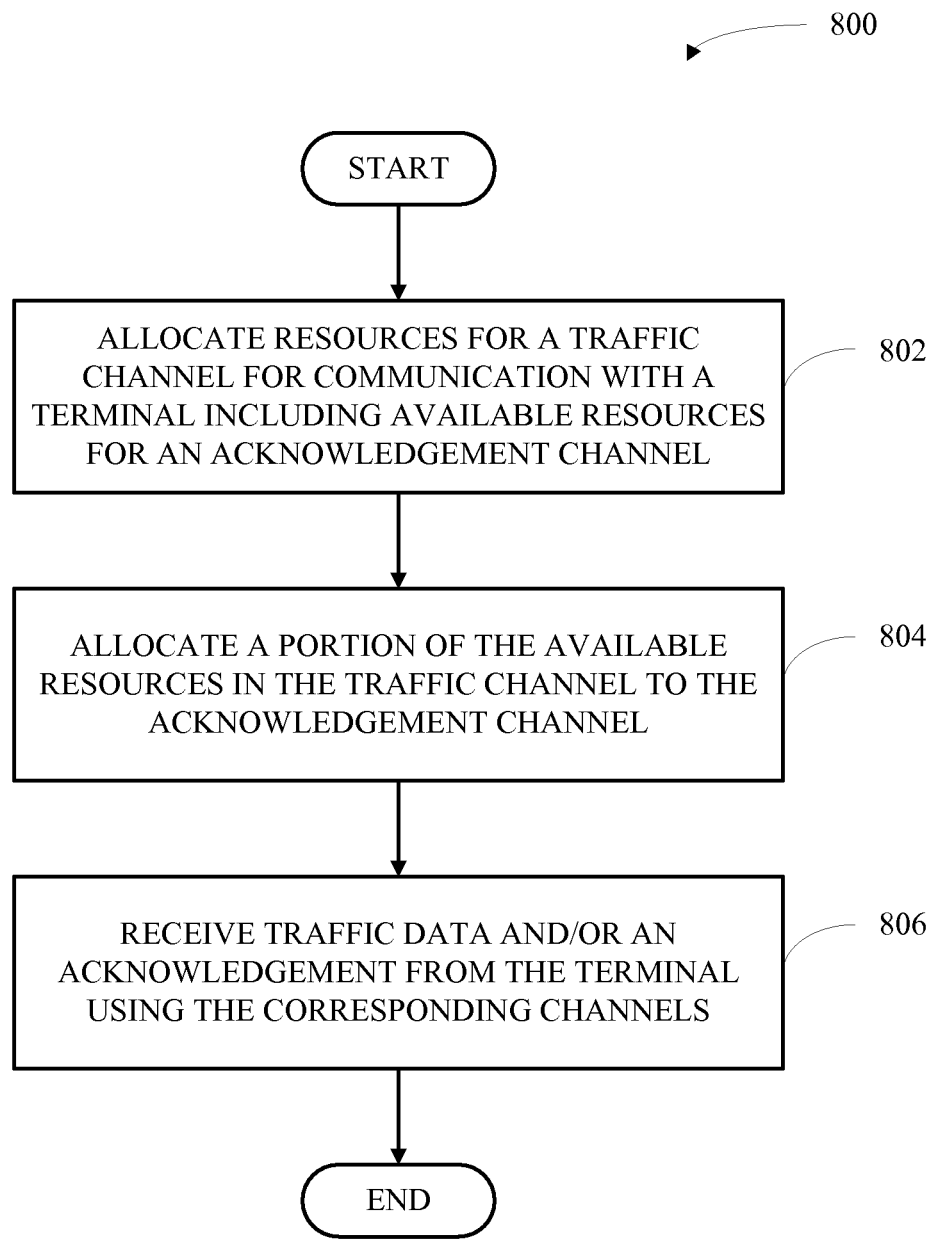
FIG. 8 is a flow diagram of a methodology for scheduling a traffic channel in a wireless communication system.
Figure 9:
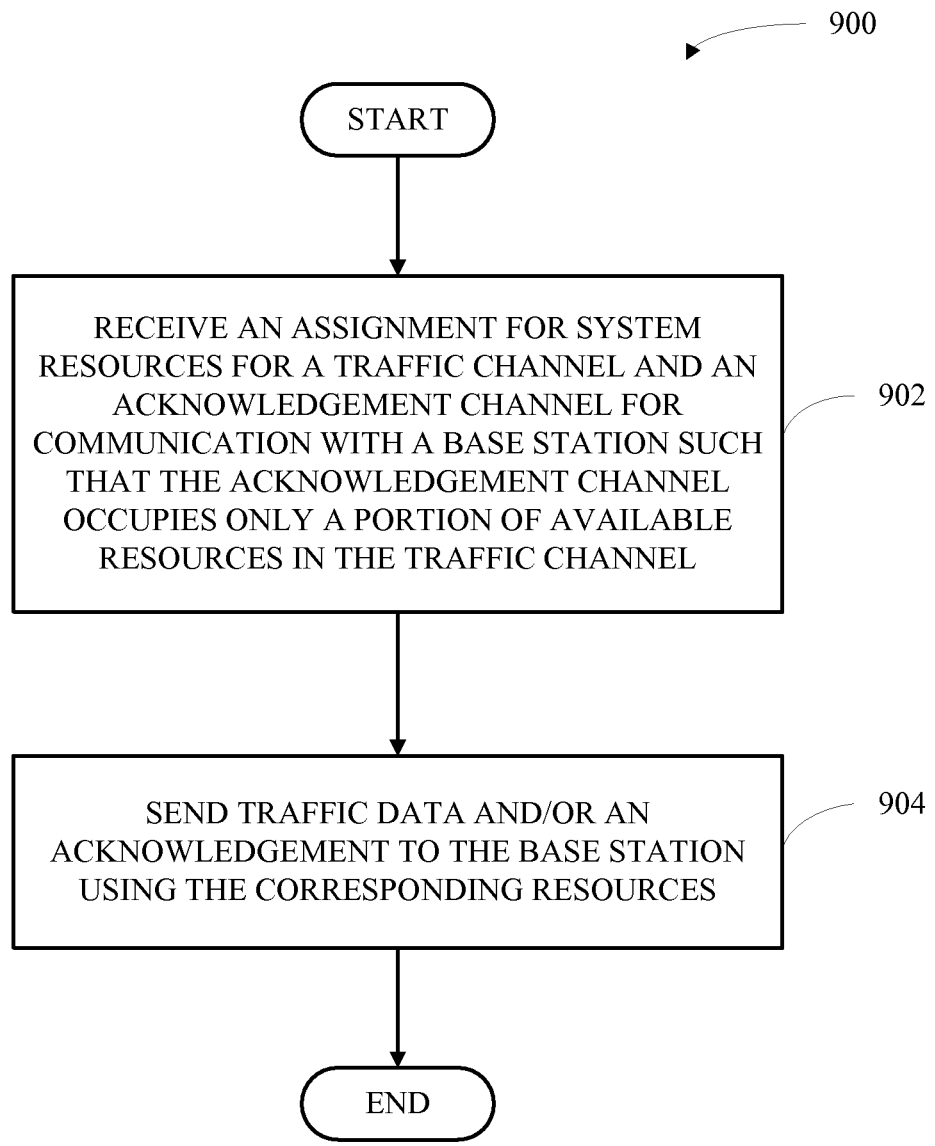
FIG. 9 is a flow diagram of a methodology for communicating on a scheduled traffic channel in a wireless communication system.

Referring to FIGS. 8-9, methodologies for scheduling control channels in a wireless communication network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 8, illustrated is a methodology 800 for scheduling a traffic channel in a wireless communication system (e.g., system 200). Methodology 800 begins at block 802, wherein resources for a traffic channel are allocated for communication with a terminal (e.g., a mobile terminal 220) on a reverse link frame. The allocated system bandwidth can correspond to, for example, one or more data tiles 310 and/or 320. In one example, the resources allocated for the traffic channel may also include available resources for an acknowledgement channel.

Next, methodology 800 proceeds to block 804, wherein a portion of the resources in the traffic channel that were made available for an acknowledgement channel at block 802 are allocated to the acknowledgement channel. In accordance with one aspect, the acknowledgement channel may be scheduled such that system bandwidth allocated for the acknowledgement channel punctures a portion of modulation symbols that comprise the bandwidth allocated for the traffic channel at block 802. In one example, system bandwidth allocated for the traffic channel and the acknowledgement channel can correspond to one or more data tiles 610 and/or 620. At block 802, system bandwidth can be allocated for a traffic channel over all or part of the OFDM symbols and/or tones that comprise data tiles 610 and/or 620. System bandwidth can then be allocated for an acknowledgement channel at block 804 by re-allocating one or more subtiles 602 in data tiles 610 and/or 620 such that system bandwidth represented by a portion of OFDM symbols in data tiles 610 and/or 620 modulated over a portion of tones is punctured by the acknowledgement channel. By way of a specific, non-limiting example, bandwidth allocated for each subtile 602 can be composed of 2 OFDM symbols modulated over 8 tones. One or two subtiles 602 may be allocated in data tiles 610 and/or 620, thereby puncturing bandwidth represented by 2 or 4 OFDM symbols modulated over 8 tones, respectively, in data tiles 610 and/or 620.

Finally, methodology 800 concludes at block 806, wherein traffic data and/or an acknowledgement can be respectively received from the terminal via the corresponding allocated resources on the reverse link frame scheduled at blocks 802 and 804. An acknowledgement received from the terminal may correspond to, for example, data and/or signaling received by the terminal on a forward link. Alternatively, a plurality of acknowledgements may be received corresponding to multiple elements of data and/or signaling. Further, one or more acknowledgements may be an acknowledgement for an element of correctly received data and/or a negative acknowledgement for an incorrectly received element of data and/or signaling. A negative acknowledgement may also be made implicitly by abstaining from sending an acknowledgement when such an acknowledgement is due for particular data and/or signaling.

FIG. 9 illustrates a methodology 900 for communicating on a scheduled traffic channel in a wireless communication system. The methodology begins at block 902, wherein an assignment for system resources for a traffic channel and an acknowledgement channel are received for communication with a base station (e.g., base station 210) such that the acknowledgement channel occupies only a portion of resources in the traffic channel that are made available for the acknowledgement channel. In accordance with one aspect, the bandwidth allocated for the traffic channel and occupied by the acknowledgement channel may correspond to a portion of modulation symbols in one or more data tiles 610 and/or 620 at which bandwidth for the traffic channel is allocated in a similar manner to methodology 800.

Upon completing the act represented at block 902, methodology 900 can conclude at block 904, wherein traffic data and/or an acknowledgement can be sent to the base station using the corresponding resources allocated at block 902. An acknowledgement sent to the base station may correspond to, for example, data and/or signaling received from the base station on a forward link. Alternatively, a plurality of acknowledgements may be received corresponding to multiple received elements of data and/or signaling. Further, one or more acknowledgements may be an acknowledgement for an element of correctly received data and/or a negative acknowledgement for an incorrectly received element of data and/or signaling. A negative acknowledgement may also be made implicitly by abstaining from sending an acknowledgement when such an acknowledgement is due for particular data and/or signaling.

Figure 10:
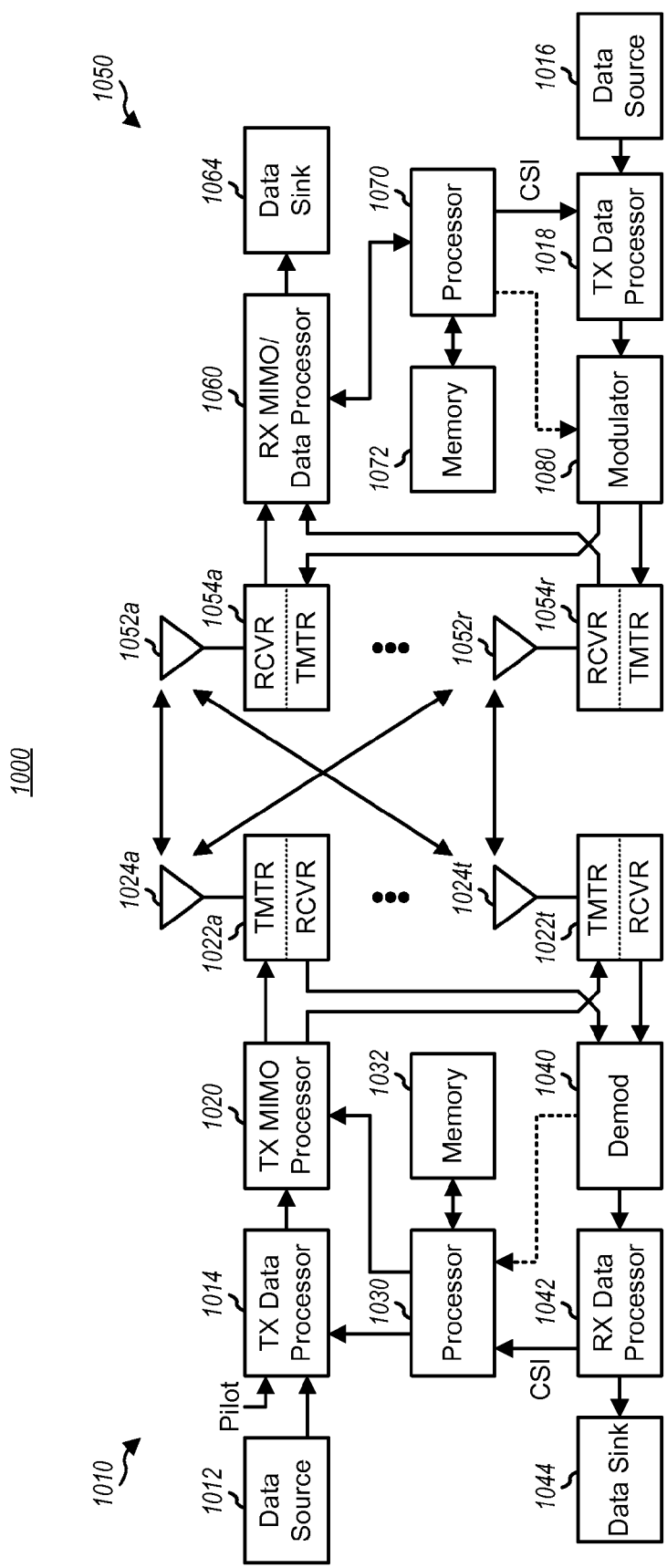
FIG. 10 is a block diagram illustrating an example wireless communication system in which one or more embodiments described herein may function.

Referring now to FIG. 10, a block diagram illustrating an example wireless communication system 1000 in which one or more embodiments described herein may function is provided. In one example, system 1000 is a multiple-input multiple-output (MIMO) system that includes a transmitter system 1010 and a receiver system 1050. It should be appreciated, however, that transmitter system 1010 and/or receiver system 1050 could also be applied to a multi-input single-output system wherein, for example, multiple transmit antennas (e.g., on a base station), may transmit one or more symbol streams to a single antenna device (e.g., a mobile station). Additionally, it should be appreciated that aspects of transmitter system 1010 and/or receiver system 1050 described herein could be utilized in connection with a single output to single input antenna system.

In accordance with one aspect, traffic data for a number of data streams are provided at transmitter system 1010 from a data source 1012 to a transmit (TX) data processor 1014. In one example, each data stream can then be transmitted via a respective transmit antenna 1024. Additionally, TX data processor 1014 can format, code, and interleave traffic data for each data stream based on a particular coding scheme selected for each respective data stream in order to provide coded data. In one example, the coded data for each data stream may then be multiplexed with pilot data using OFDM techniques. The pilot data can be, for example, a known data pattern that is processed in a known manner. Further, the pilot data may be used at receiver system 1050 to estimate channel response. Back at transmitter system 1010, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream may be determined by instructions performed on and/or provided by processor 1030.

Next, modulation symbols for all data streams can be provided to a TX processor 1020, which may further process the modulation symbols (e.g., for OFDM). TX MIMO processor 1020 may then provides $N_T$ modulation symbol streams to $N_T$ transmitters (TMTR) 1022a through 1022t. In one example, each transmitter 1022 can receive and process a respective symbol stream to provide one or more analog signals. Each transmitter 1022 may then further condition (e.g., amplify, filter, and upconvert) the analog signals to provide a modulated signal suitable for transmission over a MIMO channel. Accordingly, $N_T$ modulated signals from transmitters 1022a through 1022t can then be transmitted from $N_T$ antennas 1024a through 1024t, respectively.

In accordance with another aspect, the transmitted modulated signals can be received at receiver system 1050 by $N_R$ antennas 1052a through 1052r. The received signal from each antenna 1052 can then be provided to a respective receiver (RCVR) 1054. In one example, each receiver 1054 can condition (e.g., filter, amplify, and downconvert) a respective received signal, digitize the conditioned signal to provide samples, and then processes the samples to provide a corresponding "received" symbol stream. An RX MIMO/data processor 1060 can then receive and process the $N_R$ received symbol streams from $N_R$ receivers 1054 based on a particular receiver processing technique to provide $N_T$ "detected" symbol streams. In one example, each detected symbol stream can include symbols that are estimates of the modulation symbols transmitted for the corresponding data stream. RX processor 1060 can then process each symbol stream at least in part by demodulating, deinterleaving, and decoding each detected symbol stream to recover traffic data for a corresponding data stream. Thus, the processing by RX data processor 1018 may be complementary to that performed by TX MIMO processor 1020 and TX data processor 1014 at transmitter system 1010.

In another example, RX processor 1060 may be limited in the number of subcarriers that it may simultaneously demodulate. For example, RX processor 1060 may be limited to 512 subcarriers at 5 MHz, 128 subcarriers at 1.25 MHz, or 256 subcarriers at 2.5 MHz. Further, the channel response estimate generated by RX processor 1060 may be used to perform space/time processing at the receiver, adjust power levels, change modulation rates or schemes, and/or other appropriate actions. Additionally, RX processor 1060 may further estimate channel characteristics such as, for example, signal-to-noise-and-interference ratios (SNRs) of the detected symbol streams. RX processor 1060 can then provide estimated channel characteristics to a processor 1070. In one example, RX processor 1060 and/or processor 1070 can further derive an estimate of the "operating" SNR for the system. Processor 1070 can then provide channel state information (CSI), which may comprise information regarding the communication link and/or the received data stream. This information may include, for example, the operating SNR. The CSI can then be processed by a TX data processor 1078, modulated by a modulator 1080, conditioned by transmitters 1054a through 1054r, and transmitted back to transmitter system 1010.

Back at transmitter system 1010, the modulated signals from receiver system 1050 can then be received by antennas 1024, conditioned by receivers 1022, demodulated by a demodulator 1040, and processed by a RX data processor 1042 to recover the CSI reported by receiver system 1050. In one example, the reported CSI can then be provided to processor 1030 and used to determine data rates as well as coding and modulation schemes to be used for one or more data streams. The determined coding and modulation schemes can then be provided to transmitters 1022 for quantization and/or use in later transmissions to receiver system 1050. Additionally and/or alternatively, the reported CSI can be used by processor 1030 to generate various controls for TX data processor 1014 and TX MIMO processor 1020.

In one example, processor 1030 at transmitter system 1010 and processor 1070 at receiver system 1050 direct operation at their respective systems. Additionally, memory 1032 at transmitter system 1010 and memory 1072 at receiver system 1050 can provide storage for program codes and data used by processors 1030 and 1070, respectively. Further, at receiver system 1050, various processing techniques may be used to process the $N_R$ received signals to detect the $N_T$ transmitted symbol streams. These receiver processing techniques can include spatial and space-time receiver processing techniques, which may also be referred to as equalization techniques, and/or "successive nulling/equalization and interference cancellation" receiver processing techniques, which may also be referred to as "successive interference cancellation" or "successive cancellation" receiver processing techniques.

Figure 11:
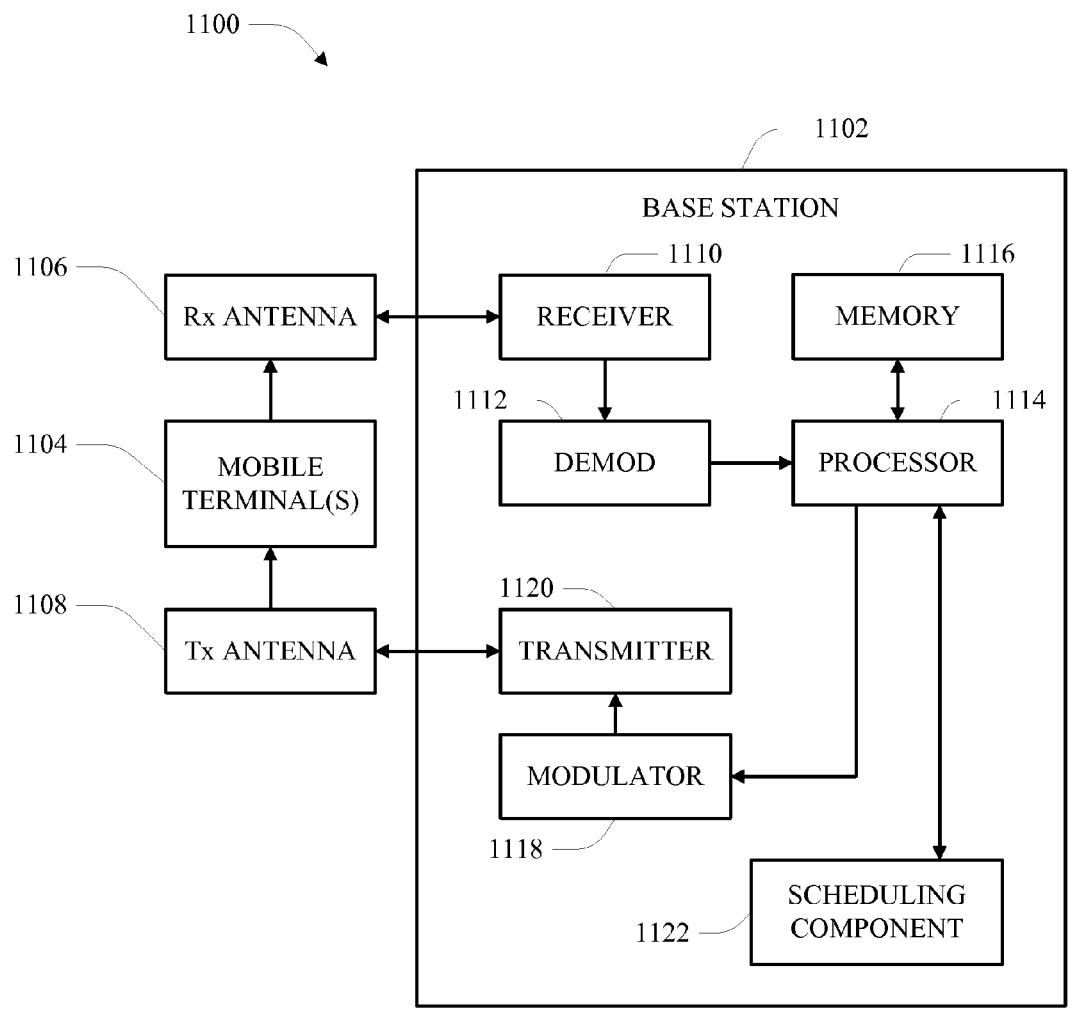
FIG. 11 is a block diagram of a system that coordinates traffic channel scheduling in a wireless communication environment in accordance with various aspects.

FIG. 11 is a block diagram of a system 1100 that coordinates traffic channel scheduling in a wireless communication environment in accordance with various aspects described herein. In one example, system 1100 includes a base station or access point 1102. As illustrated, base station 1102 can receive signal(s) from one or more mobile terminals 1104 via a receive (Rx) antenna 1106 and transmit to the one or more mobile terminals 1104 via a transmit (Tx) antenna 1108.

Additionally, base station 1102 can comprise a receiver 1110 that receives information from receive antenna 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. Additionally and/or alternatively, processor 1114 can be coupled to a scheduling component 1122, which can facilitate the allocation of system bandwidth to one or more traffic and acknowledgement channels and/or the scheduling of traffic and acknowledgement channels for communication with one or more mobile terminals 1104. In one example, base station 1102 can employ scheduling component 1122 to perform methodology 800 and/or other similar and appropriate methodologies either in conjunction with or independent from processor 1114. In one example, base station 1102 can also include a modulator 1118 that can multiplex a signal for transmission by a transmitter 1120 through transmit antenna 1108 to one or more access terminals 1104.

Figure 12:
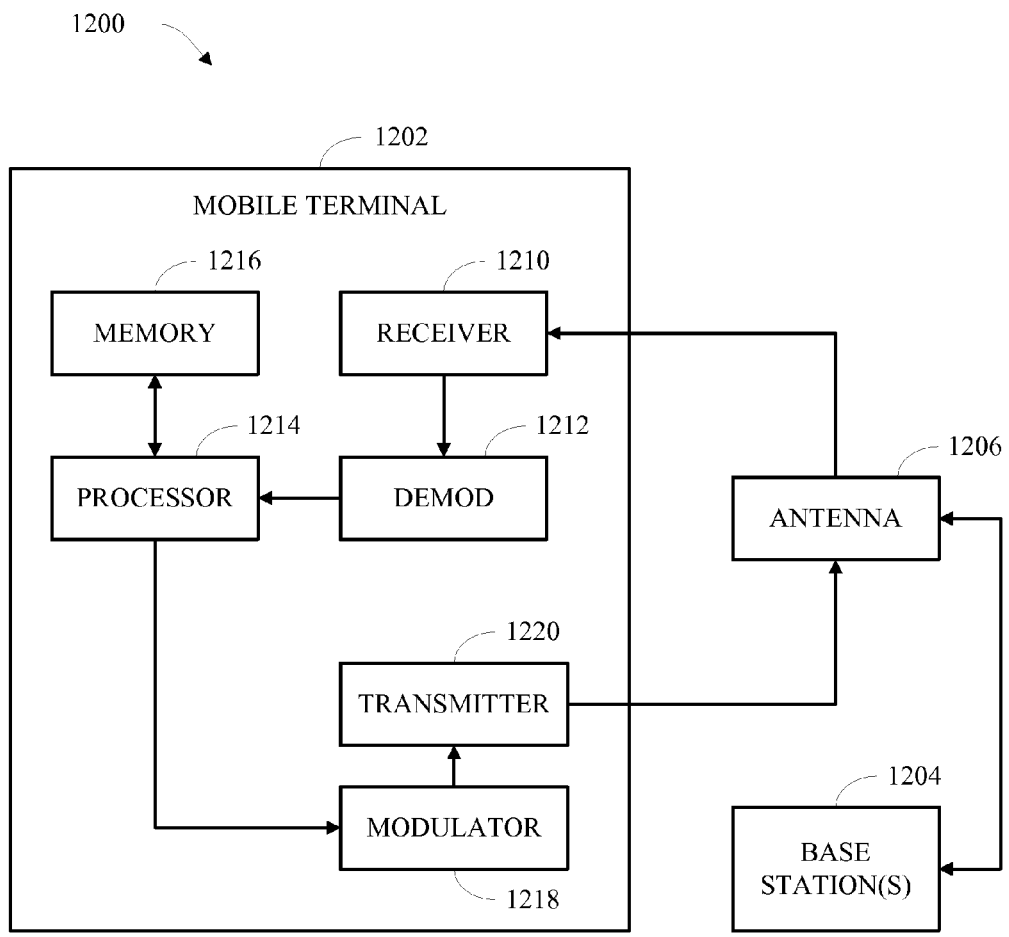
FIG. 12 is a block diagram of a system that coordinates communication of traffic data in a wireless communication environment based on a communication schedule in accordance with various aspects.

FIG. 12 is a block diagram of a system 1200 that coordinates communication of traffic data in a wireless communication environment based on a communication schedule in accordance with various aspects. In one example, system 1200 includes a mobile terminal 1202. As illustrated, mobile terminal 1202 can receive signal(s) from one or more base stations 1204 and transmit to the one or more base stations 1204 via an antenna 1208. Additionally, mobile terminal 1202 can comprise a receiver 1210 that receives information from antenna 1208. In one example, the receiver 1210 can be operatively associated with a demodulator (Demod) 1212 that demodulates received information. Demodulated symbols can then be analyzed by a processor 1212. Processor 1212 can be coupled to memory 1216, which can store data and/or program codes related to mobile terminal 1202. Additionally, mobile terminal 1202 can employ processor 1212 to perform methodology 900 and/or other similar and appropriate methodologies. In one example, mobile terminal 1202 further includes a modulator 1218 that can multiplex a signal for transmission by a transmitter 1220. Transmitter 1220 can then transmit the multiplexed signal on one or more traffic channels (e.g., one or more traffic channels scheduled and assigned to mobile terminal 1202 by one or more base stations 1204) via antenna 1208 to one or more base stations 1204.

Figure 13:
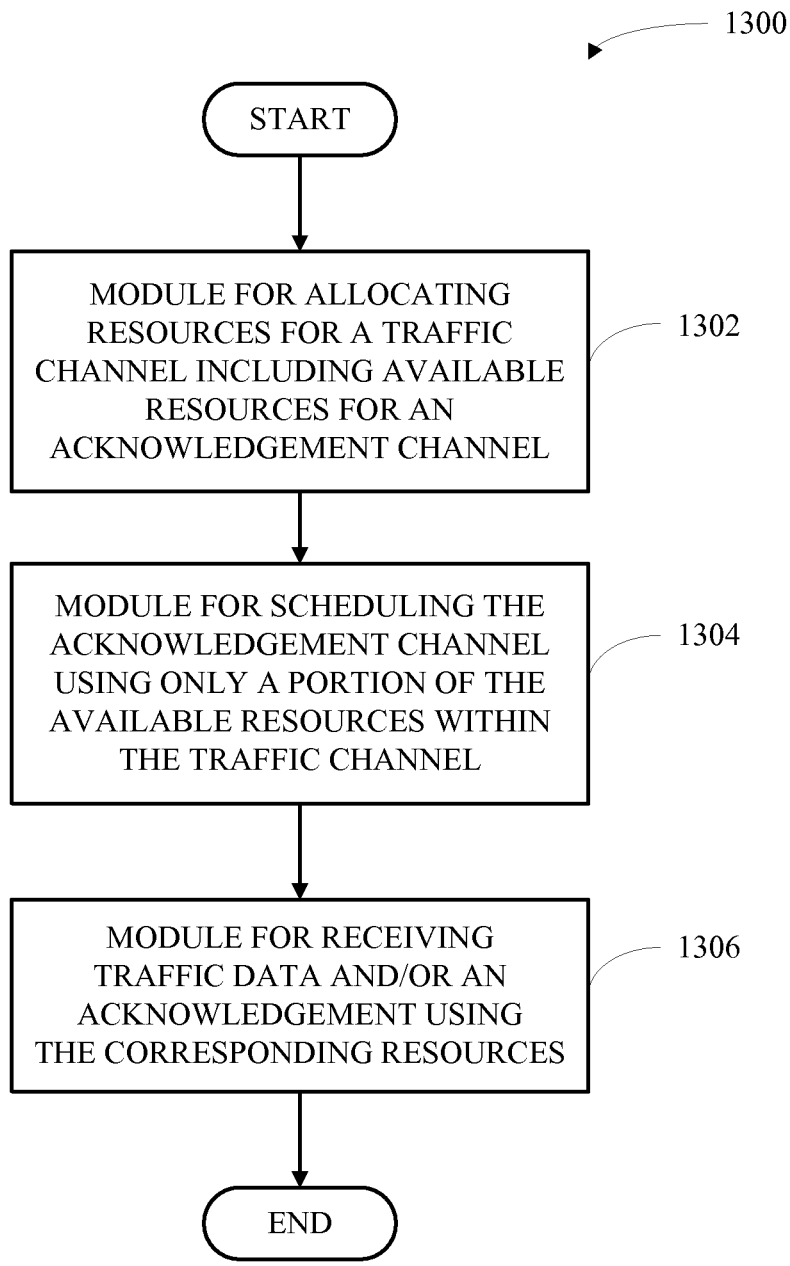
FIG. 13 is a block diagram of an apparatus that schedules a traffic channel in a wireless communication system in accordance with various aspects.

FIG. 13 illustrates an apparatus 1300 that that schedules a traffic channel in a wireless communication system (e.g., system 200) in accordance with various aspects. It is to be appreciated that apparatus 1300 is represented as including functional blocks, which can be functional blocks that represent functions implemented by a processor, software, or combination thereof (e.g., firmware). Apparatus 1300 can be implemented in conjunction with a base station (e.g., base station 210) and can include a module for allocating resources for a traffic channel including available resources for an acknowledgement channel 1302. In one example, apparatus 1300 can further include a module for scheduling an acknowledgement channel using only a portion of the available resources within the traffic channel 1304 and a module for receiving traffic data and/or an acknowledgement (e.g., from a mobile terminal 220) using the corresponding resources 1306.

Figure 14:
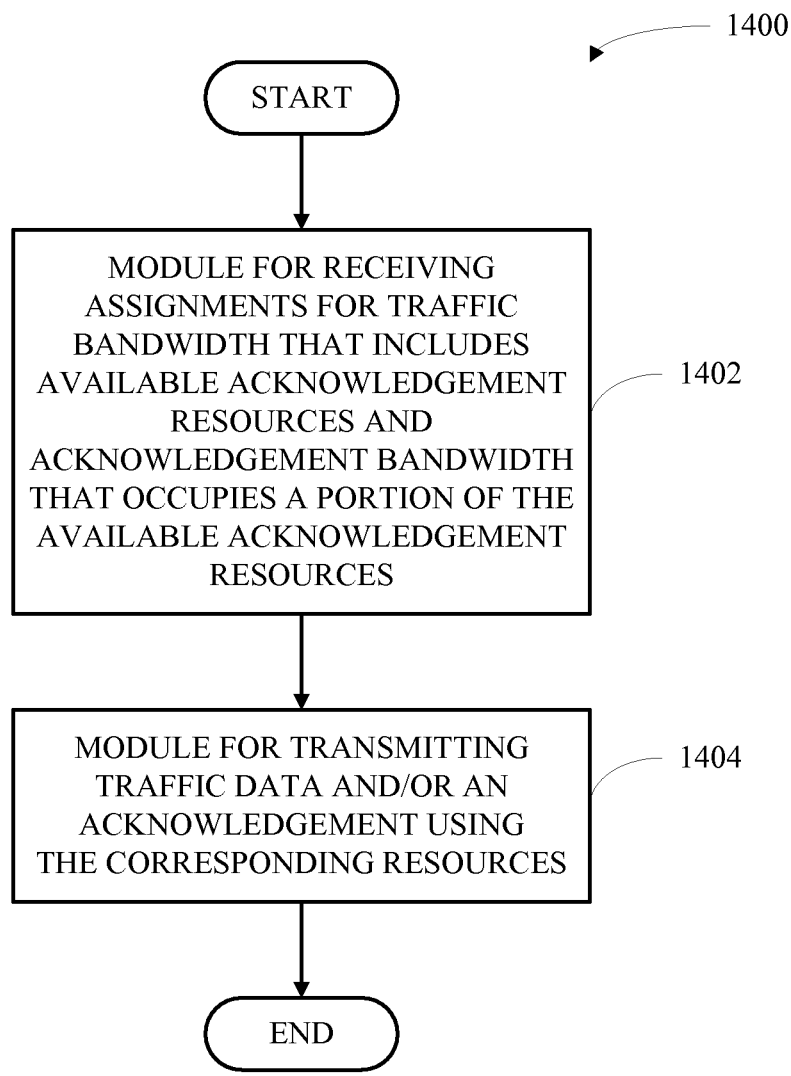
FIG. 14 is a block diagram of an apparatus that communicates on a scheduled traffic channel in a wireless communication system in accordance with various aspects.

FIG. 14 illustrates an apparatus 1400 that that communicates on a scheduled traffic channel in a wireless communication system (e.g., system 200) in accordance with various aspects described herein. It is to be appreciated that apparatus 1400 is represented as including functional blocks, which can be functional blocks that represent functions implemented by a processor, software, or combination thereof (e.g., firmware). Apparatus 1400 can be implemented in conjunction with a terminal (e.g., mobile terminal 220) and can include a module for receiving assignments for traffic bandwidth that includes available acknowledgement resources and acknowledgement bandwidth that occupies a portion of the available acknowledgement resources 1402. In one example, apparatus 1400 can further include a module for transmitting traffic data and/or an acknowledgement (e.g., to a base station 210) using the corresponding resources 1404.

Figure 15:
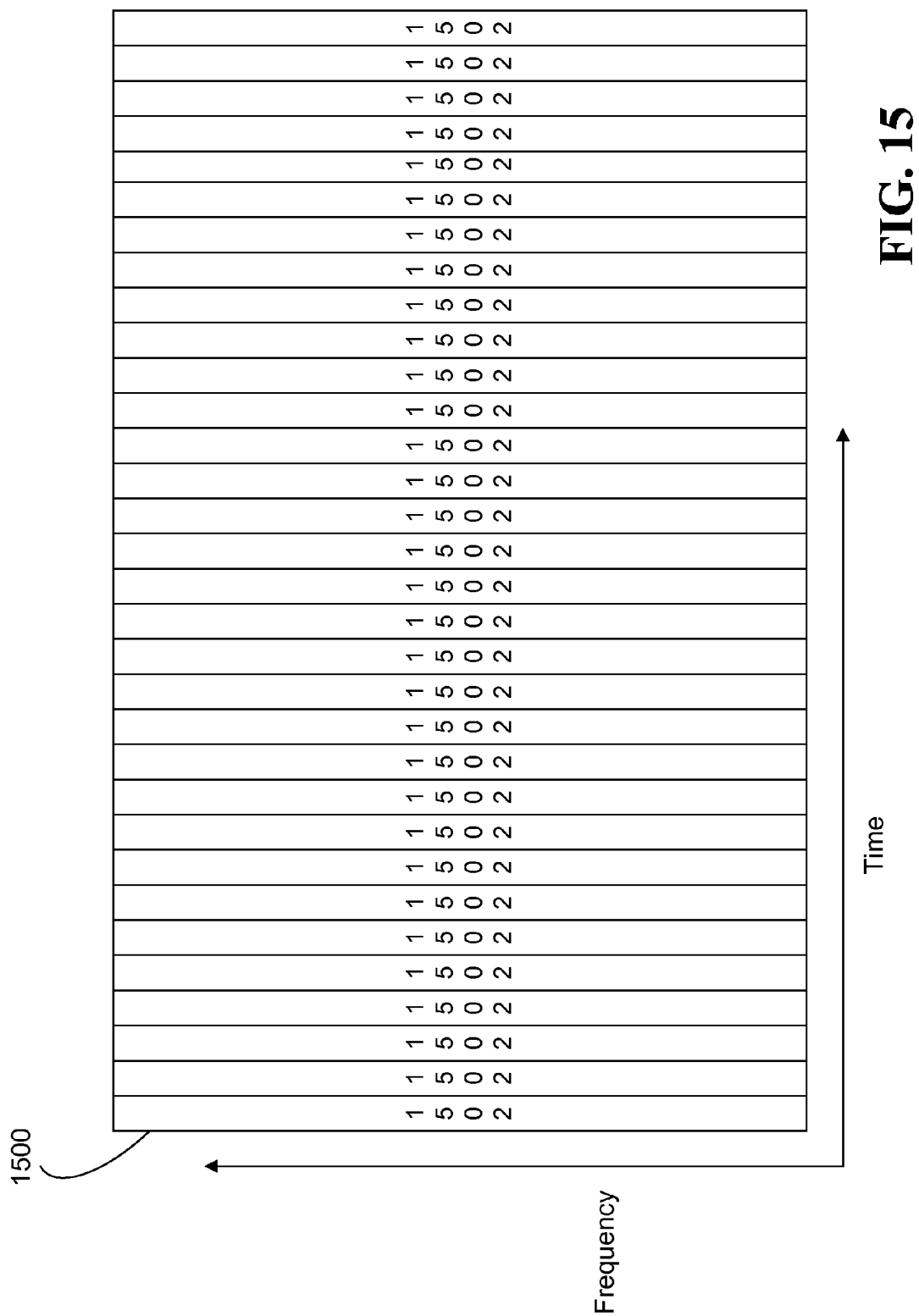
FIG. 15 illustrates an example superframe preamble that may be employed in a wireless communication system.

FIG. 15 illustrates an example superframe preamble 1500 that may be employed in a wireless communication system (e.g., system 100) in accordance with various aspects described herein. In accordance with one or more aspects, the bandwidth spanned by superframe preamble 1500 may be 1.25 MHz, 2.5 MHz, 5 MHz, or another suitable bandwidth. In one example, superframe preamble 1500 can be 8 OFDM symbols 1502 in length, and a superframe corresponding to superframe preamble 1500 may then consist of 24 frames (not shown), wherein each frame is 8 OFDM symbols 1502 in length. This example may be utilized, for example, for a 5 MHz deployment.

Alternatively, the length of superframe preamble 1500 may be doubled to 16 OFDM symbols 1502 in length. This may be done, for example, in a 2.5 MHz deployment in order to counteract the decrease in processing gain experienced in a 2.5 MHz deployment as compared to a 5 MHz deployment. Additionally, the size of a superframe corresponding to superframe preamble 1500 may then be doubled to 48 frames (not shown) that are 8 OFDM symbols 1502 in length. This may be done, for example, to decrease the amount of overhead associated with the larger superframe preamble.

As another alternative, the length of superframe preamble 1500 may be increased by a factor of four to 32 OFDM symbols 1502 in length. This may be done, for example, in a 1.25 MHz deployment in order to counteract the decrease in processing gain experienced in a 1.25 MHz deployment as compared to a 5 MHz deployment. Additionally, the size of a superframe corresponding to superframe preamble 1500 may then also be doubled to 48 frames (not shown) to decrease the amount of overhead associated with the larger superframe preamble.

In various examples, the number of OFDM symbols 1502 that constitute superframe preamble 1500 versus the number of frames in a superframe corresponding to superframe preamble 1500 and/or the number of OFDM symbols 1502 that constitute each frame in the corresponding superframe may vary by deployment. These factors may vary, for example, in order to provide sufficient ability to demodulate information maintained in superframe preamble 1500 while maintaining sufficiently low overhead. In accordance with one aspect, an overhead of less than 10% can maintained for superframe preamble 1500.

Figure 16:
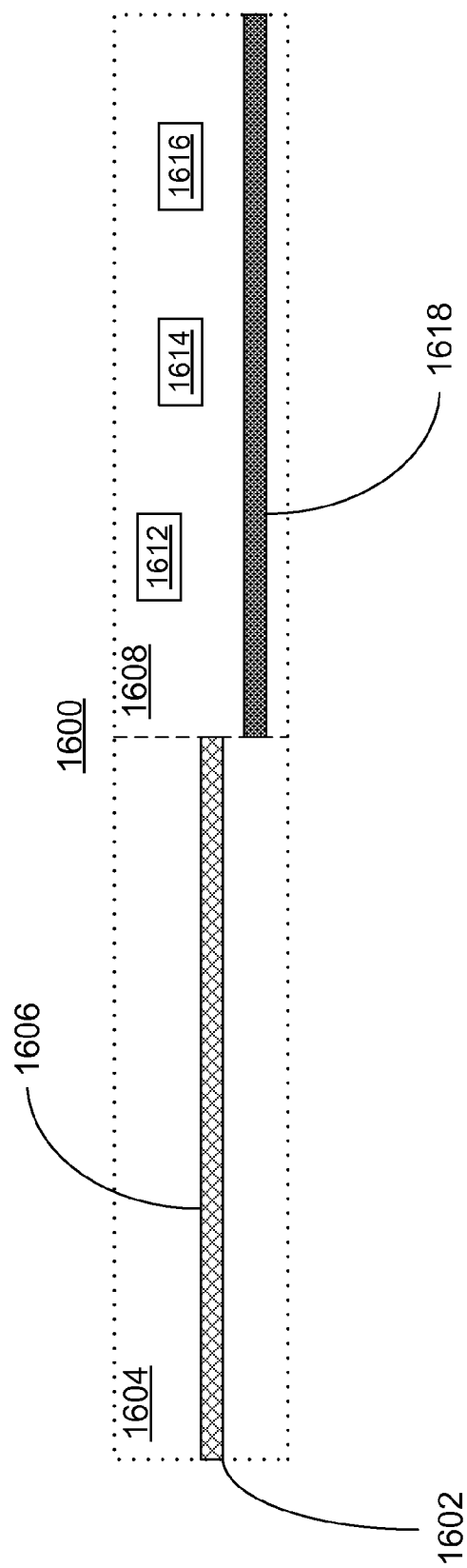
FIG. 16 illustrates an example frame structure for a multiple access wireless communication system.

FIG. 16 illustrates an example frame structure 1600 for a multiple access wireless communication system in accordance with various aspects. In accordance with one aspect, frame structure 1600 can correspond to bandwidth that is available for communication according to one or more system design parameters. In one example, frame structure 1600 includes one or more forward link frames 1604 and one or more reverse link frames 1608, each of which may comprise part of one or more superframes (e.g., superframes 710).

In accordance with one aspect, each forward link frame 1604 can include one or more control channels 1606. Each forward link control channel 1606 can provide information for functions that are necessary for proper operation of a wireless communication system (e.g., system 100). For example, these functions may be related to one or more of acquisition, forward link assignments for each access terminal (e.g., terminal 120) in the system (forward link assignments may be uniform or non-uniform for broadcast, multicast, and unicast message types), reverse link assignments for each access terminal, reverse link power control for each access terminal, reverse link acknowledgements, and/or other suitable functions. In one example, a forward link control channel 1606 can hop in each forward link frame 1604 according to a hopping sequence. A hopping sequence assigned to a control channel 1604 on the forward link may be the same as a hopping sequence assigned to one or more forward link data channels (not shown). Alternatively, a hopping sequence assigned to a forward link control channel 1604 may be unique to the control channel 1604.

In accordance with another aspect, each reverse link frame 1608 can include one or more reverse link transmissions 1612, 1614, and 1616 (e.g., terminals 120). Reverse link transmissions 1612, 1614, and 1616 are illustrated in frame structure 1600 as being a block of contiguous OFDM symbols. However, it should be appreciated that reverse link transmissions 1612, 1614, and/or 1616 may alternatively utilize symbol rate hopping, wherein each transmission 1612, 1614, and/or 1616 may correspond to non-contiguous symbol blocks. In one example, each reverse link frame 1608 can additionally include one or more reverse link control channels 1618. By way of non-limiting example, reverse link control channels 1618 can include feedback channels, pilot channels for reverse link channel estimation, acknowledgement channels that may be included in the reverse link transmissions 1612-1616 (e.g., according to a communication schedule provided by a base station 110 and/or system controller 130), and/or other appropriate channels. Further, each reverse link control channel 1618 can provide information for functions that are necessary for proper operation of a wireless communication system (e.g., system 100). For example, these functions may be related to one or more of forward link and reverse link resource requests by each access terminal in the system, channel information (e.g., channel quality information (CQI) for different types of transmission), pilots from an access terminal that may be used by an access point (e.g., a base station 110) for channel estimation purposes, and/or other suitable functions. In one example, a reverse link control channel 1618 can hop in each reverse link frame 1608 according to a hopping sequence. A hopping sequence assigned to a control channel 1618 on the reverse link may be the same as a hopping sequence assigned to one or more reverse link data channels (not shown). Alternatively, a hopping sequence assigned to a reverse link control channel 1618 may be unique to the control channel 1618.

In accordance with one aspect, one or more orthogonal codes, scrambling sequences, or the like may be utilized to multiplex users on reverse link control channels 1618, thereby separating each user and/or each unique type of information transmitted in reverse link control channels 1618. In one example, orthogonal codes may be specific to a user. Additionally and/or alternatively, orthogonal codes may be allocated by an access point to each access terminal for each communication session or shorter period (e.g., each superframe 710).

In accordance with another aspect, some of the available subcarriers in an OFDM symbol may be designated as guard subcarriers and may not be modulated. Thus, no energy may be transmitted on subcarriers designated as guard subcarriers. In one example, a number of guard subcarriers to be used in a superframe preamble (e.g., superframe preamble 1500) and/or each frame in a corresponding superframe (e.g., superframe 710) can be provided via one or more messages included in forward link control channels 1606 and/or a forward link superframe preamble. In accordance with a further aspect, one or more packets can be jointly encoded for a particular access terminal to reduce overhead transmission to the access terminal. In one example, the packets can be jointly encoded even if symbols contained in the packets are to be transmitted over multiple subcarriers. Thus, a single cyclic redundancy check may be utilized for the packets, thereby reducing overhead transmission of cyclic redundancy checks among transmissions that include symbols from the packets.

Figure 17A:
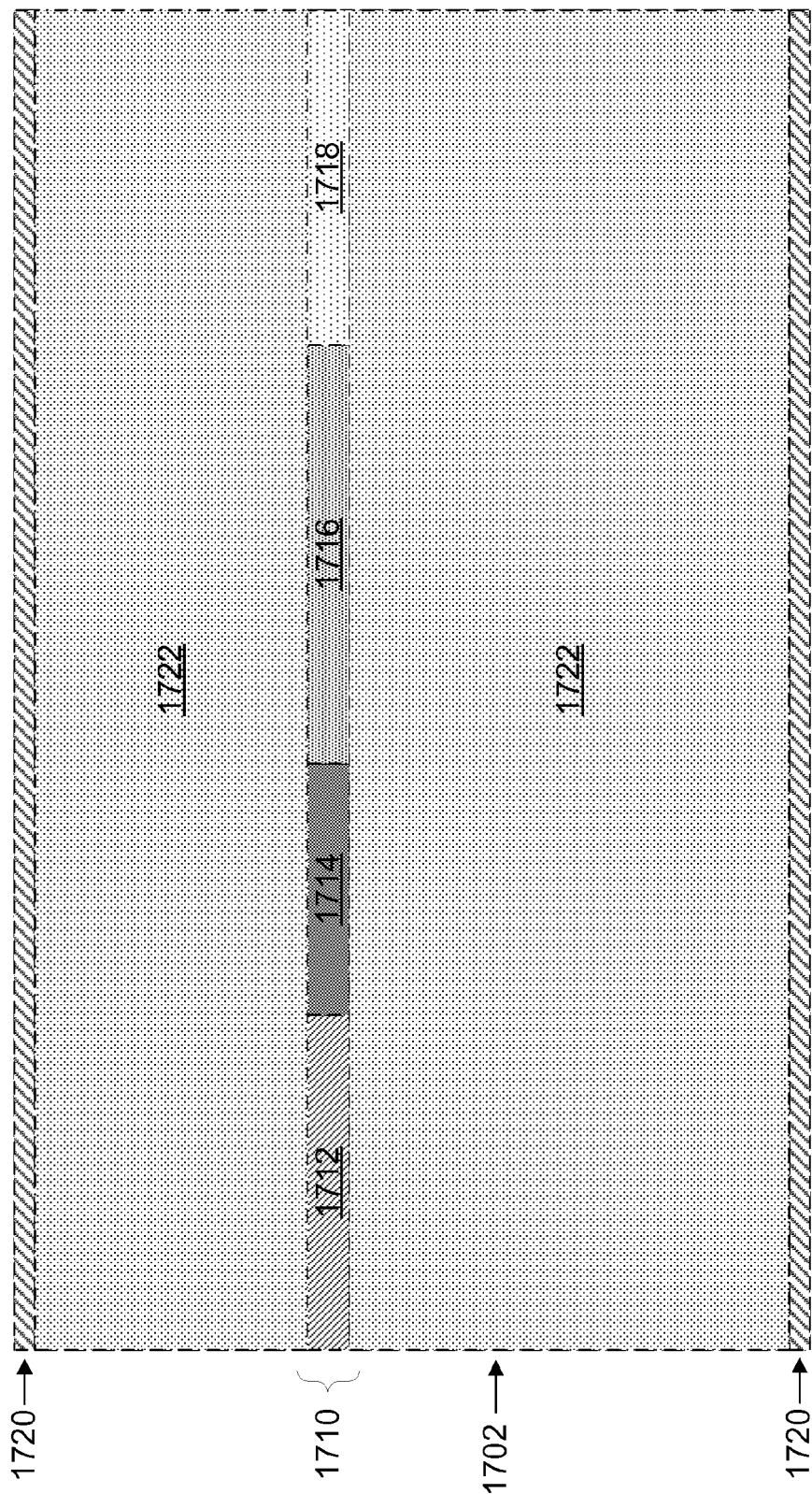
FIG. 17A illustrates an example forward link frame structure for a multiple access wireless communication system.

FIG. 17A illustrates an example forward link frame structure 1702 for a multiple access wireless communication system in accordance with various aspects. In one example, forward link frame 1702 can be composed of a predetermined number of OFDM symbols. Further, forward link frame 1702 may be divided into a control channel 1710 and one or more data channels 1722. In accordance with one aspect, control channel 1710 can comprise a contiguous or non-contiguous group of subcarriers. Further, a variable number of subcarriers can comprise control channel 1710. The number of subcarriers that comprise control channel 1710 may be assigned depending on a desired amount of control data and/or other suitable considerations. In accordance with another aspect, data channels 1722 can be generally available for data transmission.

In one example, control channel 1710 can include one or more signaling channels 1712-1718. While signaling channels 1712-1718 are illustrated in forward link frame 1702 as being multiplexed in time, it should be appreciated that signaling channels 1712-1718 may also be multiplexed using different orthogonal, quasi-orthogonal, or scrambling codes; different frequencies; and/or any combinations of time, code, and frequency. In one example, the signaling channels 1712-1718 in control channel 1710 can include one or more pilot channels 1712 and/or 1714. In a non-limiting example in which forward link frame 1702 is utilized in symbol rate hopping mode (e.g., symbol rate hopping mode 722), pilot channels 1712 and/or 1714 may be present on each OFDM symbol in forward link frame 1702. Thus, pilot channels 1712 and/or 1714 may not be present in control channel 1710 in such an example. In another example, control channel 1710 can include one or more of a signaling channel 1716 and a power control channel 1718. In one example, signaling channel 1716 can include assignment, acknowledgement, and/or power references and adjustments for data, control, and pilot/ or transmissions on the reverse link. Further, power control channel 1718 can include information regarding interference generated at various sectors in a wireless communication system (e.g., sectors 104 of system 100) due to transmissions from access terminals (e.g., terminals 100) in a sector.

In accordance with another aspect, forward link frame 1702 can further include subcarriers 1720 at the edge of the bandwidth allocated to forward link frame 1702. These subcarriers 1720 may function, for example, as quasi-guard subcarriers. In accordance with one or more of the above aspects, it should be appreciated that that where multiple transmit antennas (e.g., at a base station 110 and/or a terminal 120) can be used to transmit for a sector (e.g., sector 104), each of the transmit antennas used may share common superframe timing, superframe indices, OFDM symbol characteristics, and/ or hop sequences. Further, it should be appreciated that control channel 1710 may comprise the same allocations as a data transmission in one or more aspects. For example, if one or more data transmissions utilize block hopping (e.g., via block hopping mode 720), then blocks of similar or non-similar sizes may be allocated for control channel 1710.

Figure 17B:
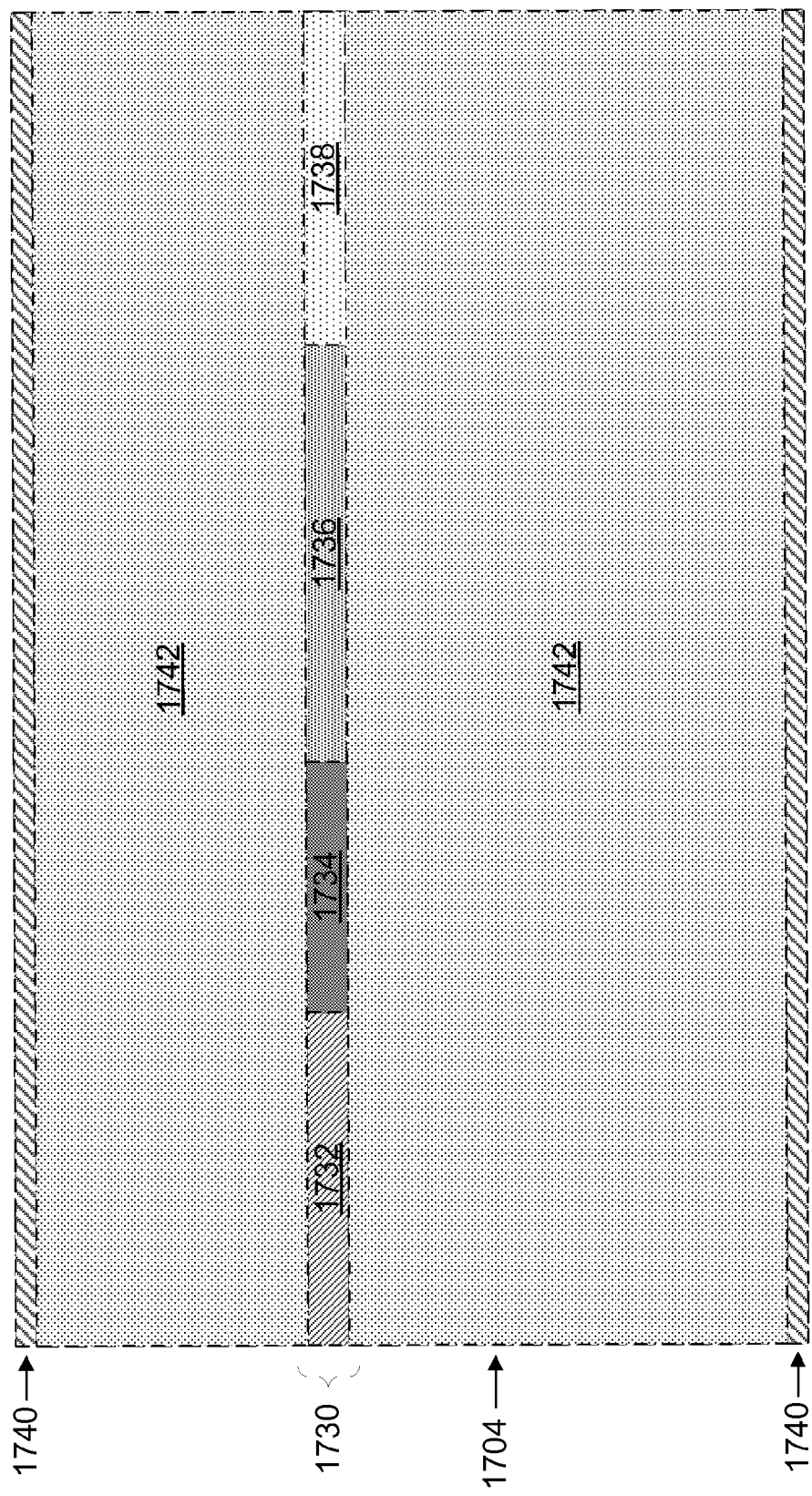
FIG. 17B illustrates an example reverse link frame structure for a multiple access wireless communication system.

FIG. 17B illustrates an example reverse link frame structure 1704 for a multiple access wireless communication system in accordance with various aspects. In one example, reverse link frame 1704 can include a control channel 1730, one or more data channels 1742, and one or more edge subcarriers 1740 in a similar manner to forward link frame 1702. In alternative examples, data channels 1742 can operate according to a block hopping mode (e.g., block hopping mode 720) or a symbol rate hopping mode (e.g., symbol rate hopping mode 722) in a given reverse link frame 1704. Additionally, data channels may operate according to a single mode at different reverse link frames 1704 or according to different modes for different reverse link frames 1704. Further, control channel 1730 can be composed of signaling channels 1732-1738 that may be multiplexed in time as illustrated in reverse link frame 1704. Alternatively, signaling channels 1732-1738 may be multiplexed using different orthogonal, quasi-orthogonal, or scrambling codes; different frequencies; and/or any combinations of time, code, and frequency.

In one example, signaling channels 1732-1738 in control channel 1730 can include a pilot channel 1732. Pilot channel 1732 can include pilots, which in one example can allow an access point (e.g., a base station 110) to estimate the reverse link. Control channel 1730 may also include a request channel 1734, which can include information to allow an access terminal (e.g., a terminal 120) to request resources for upcoming forward link frames 1702 and/or reverse link frames 1704.

In another example, control channel 1730 can include a reverse link feedback channel 1736, on which one or more access terminals can provide feedback with respect to channel information (CQI). In one example, CQI provided on reverse link feedback channel 1736 by an access terminal can relate to one or more scheduled modes and/or available modes for scheduling for a transmission to the access terminal. By way of example, modes to which the CQI can relate include beamforming, SDMA, precoding, and/or any suitable combination thereof. In another example, control channel 1730 can further include a power control channel 1738, which can be used as a reference to allow an access point to generate power control instructions for one or more reverse link transmissions (e.g., data transmissions and/or signaling transmissions) by an access terminal. In one example, one or more feedback channels 1736 may be included in power control channel 1738.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for efficient channel assignment in a wireless communication system, comprising:
    allocating first system resources for a traffic channel for communication with a first terminal on a reverse link frame, wherein the first system resources comprise available resources for an acknowledgement (ACK) channel and correspond to a data tile comprising a plurality of orthogonal frequency division multiplexing (OFDM) symbols modulated over a plurality of frequency subcarriers; and
    allocating second system resources for the ACK channel for communication with a second terminal on the reverse link frame, wherein the second system resources allocated for the ACK channel occupy only a portion of the available resources in the first system resources, and puncture a portion of the first system resources for the traffic channel.

2. The method of claim 1, wherein the plurality of OFDM symbols is 8 OFDM symbols, the plurality of frequency subcarriers is 16 frequency subcarriers, and the first system resources and second system resources are allocated from an overall system bandwidth of 5 MHz.

3. The method of claim 1, wherein the plurality of OFDM symbols is 8 OFDM symbols, the plurality of frequency subcarriers is 8 frequency subcarriers, and the first system resources and second system resources are allocated from an overall system bandwidth of 1.25 MHz or 2.5 MHz.

4. The method of claim 1, wherein the data tile includes a plurality of pilot symbols and a plurality of data symbols, the pilot symbols are located in groups composed of one or more groups of contiguous OFDM symbols modulated over one or more predetermined frequency subcarriers, and the data symbols are located at all other locations in the data tile.

5. The method of claim 4, wherein the second system resources correspond to one or more ACKCH subtiles within the data tile and the ACKCH subtiles collectively occupy fewer than all of the plurality of OFDM symbols in the data tile modulated over fewer than all of the plurality of frequency subcarriers in the data tile.

6. The method of claim 5, wherein each ACKCH subtile in the data tile occupies 2 OFDM symbols modulated over 8 frequency subcarriers.

7. The method of claim 5, wherein the ACKCH subtiles collectively puncture fewer than all of the pilot symbols in each of the groups of pilot symbols in the data tile.

8. The method of claim 1, further comprising communicating an assignment for at least one of the first system resources and the second system resources to at least one of the first terminal and the second terminal on a forward link frame.

9. The method of claim 8, further comprising receiving traffic data from the first terminal on the reverse link frame using the first system resources.

10. The method of claim 8, further comprising receiving at least one of an acknowledgement and a negative acknowledgement from the second terminal on the reverse link frame using the second system resources.

11. A wireless communications apparatus, comprising:
a memory that stores data relating to available bandwidth for communication with a first access terminal; and
a processor configured to allocate a first portion of the available bandwidth for a traffic channel for communication with the first access terminal on a reverse link frame, the first portion of the available bandwidth including available acknowledgement bandwidth and corresponding to a data tile comprising a plurality of orthogonal frequency division multiplexing (OFDM) symbols modulated over a plurality of frequency subcarriers, and to allocate a second portion of the available bandwidth for an acknowledgement channel for communication with a second access terminal on the reverse link frame, wherein the second portion of the available bandwidth occupies less than all of the available acknowledgement bandwidth and punctures a portion of the first portion of the available bandwidth for a traffic channel.

12. The wireless communications apparatus of claim 11, wherein the processor is further configured to communicate at least one of the allocated first portion of the available bandwidth and the allocated second portion of the available bandwidth to at least one of the first access terminal and the second access terminal on a forward link.

13. The wireless communications apparatus of claim 12, wherein at least one of the allocated first portion of the available bandwidth and the allocated second portion of the available bandwidth are communicated to at least one of the first access terminal and the second access terminal on a frame in the forward link.

14. The wireless communications apparatus of claim 13, wherein the available bandwidth for communication corresponds to a 5 MHz frequency band and the frame in the forward link is located in a forward link superframe, the forward link superframe comprising a superframe preamble and 24 frames.

15. The wireless communications apparatus of claim 13, wherein the available bandwidth for communication corresponds to a 2.5 MHz frequency band or a 1.25 MHz frequency band and the frame in the forward link is located in a forward link superframe, the forward link superframe comprising a superframe preamble and 48 frames.

16. The wireless communications apparatus of claim 12, wherein at least one of the allocated first portion of the available bandwidth and the allocated second portion of the available bandwidth are communicated to at least one of the first access terminal and the second access terminal on a superframe preamble in the forward link.

17. The wireless communications apparatus of claim 16, wherein the available bandwidth for communication corresponds to a 5 MHz frequency band and the superframe preamble comprises 8 OFDM symbols.

18. The wireless communications apparatus of claim 16, wherein the available bandwidth for communication corresponds to a 2.5 MHz frequency band and the superframe preamble comprises 16 OFDM symbols.

19. The wireless communications apparatus of claim 16, wherein the available bandwidth for communication corresponds to a 1.25 MHz frequency band and the superframe preamble comprises 32 OFDM symbols.

20. The wireless communications apparatus of claim 11, wherein the processor is further configured to receive traffic data from the first access terminal using the allocated first portion of available bandwidth and to receive an acknowledgement from the second access terminal using the allocated second portion of available bandwidth.

21. An apparatus that facilitates efficient channel assignment in a wireless communication system, comprising:
means for allocating resources for a traffic channel for communicating with a first terminal corresponding to a data tile having resources composed of a plurality of tones for each of a plurality of modulation symbols; and
means for allocating resources for an acknowledgement channel for communication with a second terminal such that the resources scheduled for the acknowledgement channel occupy a portion of the plurality of modulation symbols on the data tile and puncture a portion of the first system resources for the traffic channel.

22. The apparatus of claim 21, further comprising means for communicating with at least one of the first terminal and the second terminal on the reverse link frame using the allocated resources.

23. A non-transitory computer-readable medium having stored thereon computer-executable instructions for channel structuring in a wireless communication system, the instructions comprising:
allocating traffic bandwidth for communication with a first wireless terminal, wherein the traffic bandwidth includes available acknowledgement bandwidth and corresponds to a data tile comprising a plurality of orthogonal frequency division multiplexing (OFDM) symbols modulated over a plurality of frequency subcarriers;

allocating acknowledgement bandwidth for communication with a second wireless terminal over less than all of the available acknowledgement bandwidth, wherein the allocated acknowledgement bandwidth punctures a portion of the allocated traffic bandwidth; and communicating an assignment for the acknowledgement bandwidth and the traffic bandwidth to at least one of the first wireless terminal and the second wireless terminal.

24. The non-transitory computer-readable medium of claim 23, wherein the allocating traffic bandwidth and the allocating acknowledgement bandwidth include allocating bandwidth from available system bandwidth.

25. The non-transitory computer-readable medium of claim 24, wherein the available system bandwidth corresponds to a plurality of frequency subcarriers over a 5 MHz frequency band, a 2.5 MHz frequency band, or a 1.25 MHz frequency band.

26. The computer-readable medium of claim 23, further comprising instructions for one or more of receiving traffic data from the first wireless terminal using the assigned traffic bandwidth and receiving an acknowledgement from the second wireless terminal using the assigned acknowledgement bandwidth.

27. A processor that executes computer-executable instructions for efficient channel assignment in a wireless communication environment, the instructions comprising:

assigning a first portion of available system bandwidth to a traffic channel for communication with one or more first terminals, the first portion of available system bandwidth corresponding to a plurality of modulation symbols modulated over a plurality of frequency subcarriers; and assigning a second portion of the available system bandwidth to an acknowledgement channel for communication with the one or more second terminals, wherein the second portion of the available bandwidth punctures less than all of the modulation symbols corresponding to the first portion of the available system bandwidth.

28. A method for efficient communication in a wireless communication system, comprising:

receiving, by a first terminal, scheduled system resources for a traffic channel and an acknowledgement channel, wherein the scheduled system resources for the acknowledgement bandwidth channel puncture a portion of the scheduled system resources for the traffic channel, wherein the acknowledgment channel is allocated for use by a second terminal in sending at least one acknowledgment to a base station; and communicating traffic data to the base station using the scheduled system resources.

29. The method of claim 28, wherein the traffic channel corresponds to a data tile, and the data tile is composed of a plurality of orthogonal frequency division multiplexing (OFDM) symbols modulated over a plurality of frequency subcarriers.

30. The method of claim 29, wherein the acknowledgement channel corresponds to one or more acknowledgement subtiles within the data tile, and the acknowledgement subtiles collectively occupy fewer than all of the plurality of OFDM symbols in the data tile modulated over fewer than all of the plurality of frequency subcarriers in the data tile.

31. The method of claim 30, wherein the data tile includes a plurality of pilot symbols and the acknowledgement subtiles collectively puncture fewer than all of the pilot symbols in the data tile.

32. A wireless communications apparatus, comprising:

a memory that stores data relating to an assignment of modulation symbols for a traffic channel for communication with a first terminal and an assignment of modulation symbols for an acknowledgement channel for communication with a second terminal, wherein the acknowledgement channel occupies a portion of the modulation symbols for the traffic channel; and a processor configured to communicate one or more of traffic data on the modulation symbols corresponding to the traffic channel and an acknowledgement on the modulation symbols corresponding to the acknowledgement channel.

33. An apparatus that facilitates efficient communication in a wireless communication system, comprising:

means for receiving, by a first terminal, scheduled bandwidth for communication corresponding to a traffic channel that includes available acknowledgement bandwidth and an acknowledgement channel that occupies less than all of the available acknowledgement bandwidth, wherein the acknowledgment channel is allocated for use by a second terminal in sending at least on acknowledgment to an access point; and means for communicating one or more of traffic data and an acknowledgement to the access point using the scheduled bandwidth.

34. A non-transitory computer-readable medium having stored thereon computer-executable instructions for efficient communication in a wireless network system, the instructions comprising:

receiving a communication schedule that includes allocated bandwidth for a traffic channel associated with a first terminal and allocated bandwidth for an acknowledgement channel associated with a second terminal over a plurality of modulation symbols such that the allocated bandwidth for the acknowledgement channel occupies the allocated bandwidth for the traffic channel over a portion of the plurality of modulation symbols; and communicating one or more of traffic data and acknowledgement data using the allocated bandwidth.

35. The non-transitory computer-readable medium of claim 34, wherein the communication schedule is received on a frame in the forward link.

36. The non-transitory computer-readable medium of claim 34, wherein the communication schedule is received on a super-frame preamble in the forward link.

37. A processor that executes computer-executable instructions for communicating in a wireless network environment, the instructions comprising:

obtaining scheduled traffic bandwidth associated with a first terminal, the scheduled traffic bandwidth including available acknowledgement bandwidth and scheduled acknowledgement bandwidth, wherein the scheduled acknowledgement bandwidth occupies only a portion of the available acknowledgement bandwidth, and wherein the scheduled acknowledgment bandwidth is allocated for use by a second terminal in sending at least one acknowledgment to a base station; and communicating traffic data to the base station using the scheduled traffic bandwidth.

38. The processor of claim 37, wherein the scheduled traffic bandwidth corresponds to a plurality of modulation symbols and the scheduled acknowledgement bandwidth occupies a portion of the scheduled traffic bandwidth corresponding to a portion of the plurality of modulation symbols.

* * * * *